(12) United States Patent
Yoshikawa et al.

(10) Patent No.: US 11,149,817 B2
(45) Date of Patent: Oct. 19, 2021

(54) DAMPER DEVICE

(71) Applicants: AISIN AW INDUSTRIES CO., LTD, Echizen (JP); AISIN AW CO., LTD., Anjo (JP)

(72) Inventors: Takuya Yoshikawa, Echizen (JP); Aki Ogawa, Echizen (JP); Yoshihiro Yoshida, Echizen (JP); Akiyoshi Kato, Echizen (JP); Ryosuke Otsuka, Echizen (JP); Kazuyoshi Ito, Anjo (JP); Masaki Wajima, Anjo (JP)

(73) Assignees: AISIN AW INDUSTRIES CO., LTD., Echizen (JP); AISIN AW CO., LTD., Anjo (JP)

( * ) Notice: Subject to any disclaimer, the term of this patent is extended or adjusted under 35 U.S.C. 154(b) by 189 days.

(21) Appl. No.: 16/442,817

(22) Filed: Jun. 17, 2019

(65) Prior Publication Data

US 2019/0301562 A1 Oct. 3, 2019

Related U.S. Application Data

(62) Division of application No. 16/062,823, filed as application No. PCT/JP2017/003184 on Jan. 30, 2017.

(30) Foreign Application Priority Data

Jan. 29, 2016 (JP) ................................. 2016-016466

(51) Int. Cl.
| | |
|---|---|
| *F16F 15/123* | (2006.01) |
| *F16F 15/31* | (2006.01) |
| *F16H 1/28* | (2006.01) |
| *F16F 15/14* | (2006.01) |
| *F16H 45/02* | (2006.01) |

(52) U.S. Cl.
CPC .... *F16F 15/12353* (2013.01); *F16F 15/1478* (2013.01); *F16F 15/31* (2013.01);
(Continued)

(58) Field of Classification Search
CPC .. F16F 15/12353; F16F 15/1478; F16F 15/31; F16F 2222/08; F16F 15/13407;
(Continued)

(56) References Cited

U.S. PATENT DOCUMENTS

| | | |
|---|---|---|
| 4,378,220 A | 3/1983 | Seppala et al. |
| 5,048,658 A | 9/1991 | Reik |

(Continued)

FOREIGN PATENT DOCUMENTS

| | | |
|---|---|---|
| DE | 197 36 843 A1 | 3/1999 |
| DE | 101 55 532 A1 | 5/2003 |

(Continued)

OTHER PUBLICATIONS

Apr. 25, 2017 International Search Report issued in International Patent Application No. PCT/JP2017/003184.

*Primary Examiner* — Greg Binda
(74) *Attorney, Agent, or Firm* — Oliff PLC

(57) ABSTRACT

A damper device includes a plurality of rotational elements, a plurality of elastic bodies, a rotary inertia mass damper and a housing that houses the plurality of rotational elements, the plurality of elastic bodies and the rotary inertia mass damper, the housing including a front cover. The rotary inertia mass damper is configured to include a planetary gear that includes a sun gear, a plurality of pinion gears, and a carrier that rotatably supports the plurality of pinion gears. The carrier is centered by either the sun gear or a member that rotates integrally with the sun gear by being radially supported by either the sun gear or the member that rotates integrally with the sun gear. In addition, the carrier is spline-engaged to the front cover when a lockup clutch is engaged.

7 Claims, 13 Drawing Sheets

(52) U.S. Cl.
CPC ............ *F16H 1/28* (2013.01); *F16F 2222/08* (2013.01); *F16H 2045/021* (2013.01); *F16H 2045/0226* (2013.01); *F16H 2045/0247* (2013.01); *F16H 2045/0268* (2013.01); *F16H 2045/0284* (2013.01); *Y10T 74/2131* (2015.01)

(58) Field of Classification Search
CPC ................. F16H 1/28; F16H 2045/021; F16H 2045/0226; F16H 2045/0247; F16H 2045/0268; F16H 2045/0284; Y10T 74/2131
USPC ................. 464/68.1, 68.8; 475/347
See application file for complete search history.

(56) References Cited

U.S. PATENT DOCUMENTS

| | | | |
|---|---|---|---|
| 5,863,274 A | 1/1999 | Jackel | |
| 5,976,048 A | 11/1999 | Sudau et al. | |
| 6,126,568 A | 10/2000 | Sudau | |
| 6,231,472 B1 | 5/2001 | Sudau et al. | |
| 8,845,479 B2 | 9/2014 | Hwang et al. | |
| 9,267,569 B2* | 2/2016 | Franke | F16F 15/1206 |
| 10,677,313 B2 | 6/2020 | Yoshikawa et al. | |
| 2014/0274524 A1 | 9/2014 | Murakami | |
| 2017/0261065 A1 | 9/2017 | Yoshikawa et al. | |
| 2018/0283490 A1* | 10/2018 | Nakamura | F16F 15/22 |
| 2020/0355252 A1* | 11/2020 | Ishibashi | F16H 45/02 |

FOREIGN PATENT DOCUMENTS

| | | |
|---|---|---|
| DE | 10 2013 018 996 A1 | 5/2015 |
| EP | 3 239 561 A1 | 11/2017 |
| JP | H09-196122 A | 7/1997 |
| JP | 2000-154863 A | 6/2000 |
| JP | 2014-177956 A | 9/2014 |

\* cited by examiner

DAMPER DEVICE

This application is a divisional application of application Ser. No. 16/062,823, filed Jun. 15, 2018, which is the National Stage of International Application No. PCT/JP2017/003184 filed Jan. 30, 2017, which claims the benefit of Japanese Patent Application No. JP2016-016466 filed Jan. 29, 2016, the contents of which are incorporated herein by reference.

TECHNICAL FIELD

The present disclosure relates to a damper device including a rotary inertia mass damper.

BACKGROUND

A conventionally known torsional vibration damper includes a rotary inertia mass damper with a planetary gear that includes a sun gear (87), a pinion gear (83) and a ring gear (106) (as shown in, for example, Patent Literature 1). The torsional vibration damper includes a cover plate (79) that is fixed to a turbine shell (29) and forms a drive side damper element (81) of the torsional vibration damper together with another cover plates (97, 99) fixed thereto, and a spring (100) that transmits a torque between the cover plates (79-99) and the sun gear (87). The sun gear (87) is disposed between the cover plates (79, 97) in an axial direction so as to work as a driven side damper element (88). The cover plate (79) includes a journal portion (82) extruded to a lockup piston (63) that is coupled with the turbine shell (29) via a transmission element (77). The pinion gear (83) that meshes with the sun gear (87) and the ring gear (106) is rotatably supported by the lockup piston (63) and the cover plate (79) or a carrier via the journal portion (82). In the conventional torsional vibration damper, the spring (100) is deflected and the ring gear (106) or a mass body rotates in accordance with a relative rotation between the cover plates (79-97) and the sun gear (87) when a lockup clutch is engaged and the cover plates (79-97) rotates (are twisted) with respect to the sun gear (87). Thus, an inertia torque according to a difference in angular acceleration between the cover plates (79-97) and the sun gear (87) is applied from the ring gear (106) or the mass body to the sun gear (87) or the output element of the torsional vibration damper via the pinion gear (83), thereby improving the vibration damping performance of the torsional vibration damper.

CITATION LIST

Patent Literature

PTL1: Japanese Patent Application Laid Open No. 2000-154863

SUMMARY

In the conventional torsional vibration damper, it is preferable to restrict the relative rotation between the cover plates and the sun gear from the viewpoint of protecting the spring when a larger torque is transmitted to the cover plate (input element) so that an excessive load including the inertia torque from the rotary inertia mass damper does not act on the spring. However, the Patent Literature 1 does not disclose anything with respect to a restriction of the relative rotation between the cover plates and the sun gear. Hence, there remains problems in durability of the above torsional vibration damper.

A subject matter of the disclosure is to improve durability of the damper device with the rotary inertia mass damper.

The disclosure is directed to a damper device. The damper device is configured to include a first rotational element to which a torque from an engine is transmitted, a second rotational element, a third rotational element, a first elastic body arranged to transmit a torque between the first element and the second element, a second elastic body arranged to transmit a torque between the second element and the third element, and a rotary inertia mass damper with a mass body rotating in accordance with relative rotation between the first rotational element and the third rotational element. The damper device includes a stopper configured to restrict the relative rotation between the first rotational element and the third rotational element. The rotary inertia mass damper is configured to include a planetary gear that includes a sun gear, a plurality of pinion gears that mesh with the sun gear, and a ring gear that works as the mass body. The first rotational element is configured to include a first rotational support member and a second rotational support member that are coupled with each other so as to be opposed to each other in an axial direction of the damper device. The first and the second rotational support members rotatably support the plurality of pinion gears. The third rotational element is configured to include an outer teeth gear portion that meshes with the plurality of pinion gears in an outer circumferential portion thereof. The third rotational element is disposed between the first and the second rotational support members in the axial direction so as to work as the sun gear. The stopper is configured to include a contact portion arranged in the outer circumferential portion of the third rotational element so as to contact with a portion of the first rotational element in accordance with the relative rotation between the first rotational element and the third rotational element.

The damper device is capable of restricting the relative rotation between the first rotational element and the third rotational element so as to prevent an excessive load including the inertia torque from the rotary inertia mass damper from acting on the first and the second springs when a larger torque is transmitted between the first and the third rotational elements, thereby satisfactorily protecting the first and the second springs. Further, the contact portion of the stopper is arranged in the outer circumferential portion of the third rotational element (sun gear) so as to make a distance from the axial center of the damper device to the contact portion closer to a distance from the axial center of the damper device to a support portion of the pinion gears in the first rotational element. This decreases moment acting on the first rotational element (the first and the second rotational support members) that supports the plurality of pinion gears and prevents deformation and so on of the first rotational element when the contact portion contacts with the first rotational element so as to restrict the relative rotation between the first rotational element and the third rotational element. Accordingly, the durability of the damper device with the rotary inertia mass damper can be improved.

DESCRIPTION OF EMBODIMENTS

The following describes some embodiments of the disclosure with reference to drawings.

Figure 1:
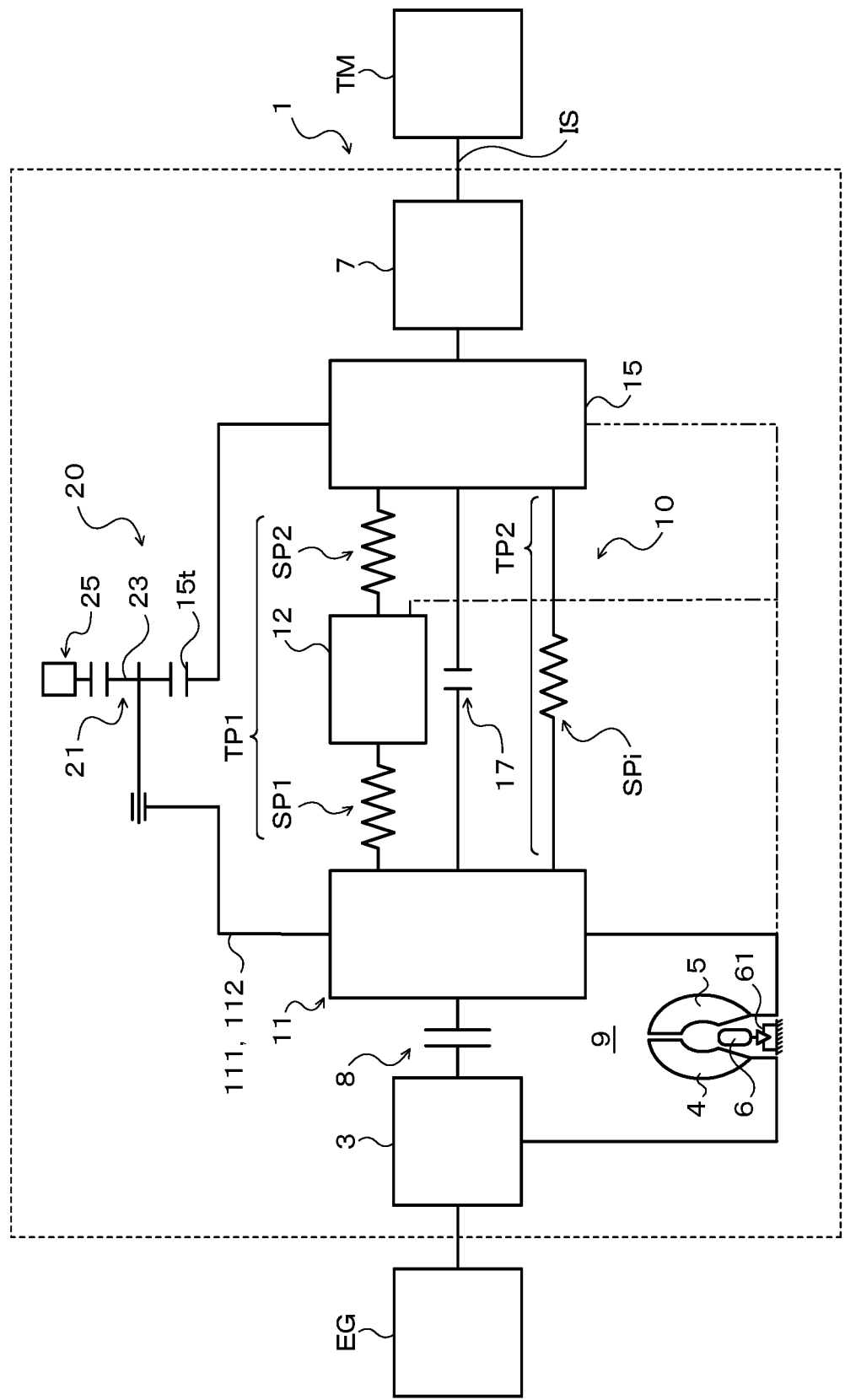
FIG. 1 is a schematic configuration diagram illustrating a starting device including a damper device according to the disclosure.
Figure 2:
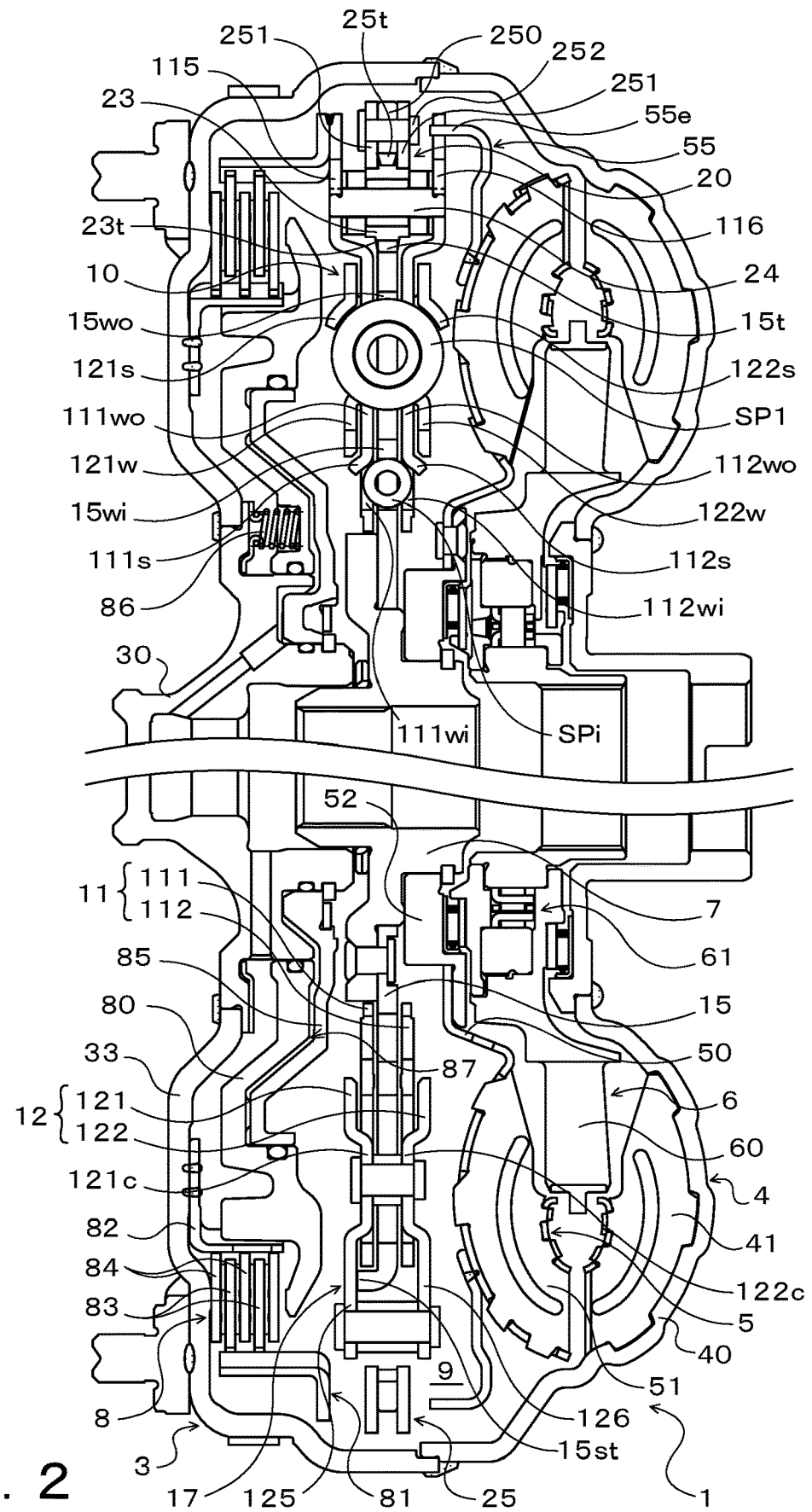
FIG. 2 is a sectional view illustrating the starting device illustrated in FIG. 1.

FIG. 1 is a schematic configuration diagram illustrating a starting device 1 including a damper device 10 according to the disclosure. FIG. 2 is a sectional view illustrating the starting device 1. The starting device 1 illustrated in these drawings is mounted on a vehicle equipped with an engine (internal combustion engine) EG as a driving source and may include, in addition to the damper device 10, for example, a front cover 3 serving as an input member coupled with a crankshaft of the engine EG and configured to receive a torque transmitted from the engine EG, a pump impeller (input-side fluid transmission element) 4 fixed to the front cover 3 in order to form a housing with the pump impeller 4, a turbine runner (output-side fluid transmission element) 5 arranged to be rotatable coaxially with the pump impeller 4, a damper hub 7 serving as an output member connected with the damper device 10 and fixed to an input shaft IS of a transmission TM that is either an automatic transmission (AT) or a continuously variable transmission (CVT), and a lockup clutch 8.

In the description below, a term "axial direction" basically means an extending direction of a central axis (axial center) of the starting device 1 or the damper device 10, unless otherwise specified. A term "radial direction" basically means a radial direction of the starting device 1, the damper device 10 or a rotational element of the damper device 10 and so on, i.e., an extending direction of a straight line extended in a direction perpendicular to the central axis (radial direction) from the central axis of the starting device 1 or the damper device 10, unless otherwise specified. Additionally, a term "circumferential direction" basically means a circumferential direction of the starting device 1, the damper device 10 or a rotational element of the damper device 10 and so on, i.e., a direction along a rotation direction of the rotational element, unless otherwise specified.

As shown in FIG. 2, the pump impeller 4 includes a pump shell 40 closely fixed to the front cover 3 to define a fluid chamber 9 in which hydraulic oil flows and a plurality of pump blades 41 provided on an inner surface of the pump shell 40. As shown in FIG. 2, the turbine runner 5 includes a turbine shell 50 and a plurality of turbine blades 51 provided on an inner surface of the turbine shell 50. An inner circumferential portion of the turbine shell 50 is fixed to a turbine hub 52 by means of a plurality of rivets. The turbine hub 52 is rotatably supported by the damper hub 7. The motion of the turbine hub 52 (turbine runner 5) in the axial direction of the starting device 1 is restricted by the damper hub 7 and a snap ring fitted to the damper hub 7.

The pump impeller 4 and the turbine runner 5 are opposed to each other, and a stator 6 is disposed coaxially between the pump impeller 4 and the turbine runner 5 to straighten the flow of hydraulic oil (hydraulic fluid) from the turbine runner 5 to the pump impeller 4. The stator 6 includes a plurality of stator blades 60. The rotation direction of the stator 6 is set to only one direction by a one-way clutch 61. The pump impeller 4, the turbine runner 5 and the stator 6 form a torus (annular flow path) to circulate the hydraulic oil and work as a torque converter (fluid transmission device) with the torque amplification function. In the starting device 1, however, the stator 6 and the one-way clutch 61 may be omitted, and the pump impeller 4 and the turbine runner 5 may work as fluid coupling.

The lockup clutch 8 is a hydraulic multi-plate clutch which executes and releases a lockup in which the front cover 3 and the damper hub 7 are coupled with each other via the damper device 10. The lockup clutch 8 includes a lockup piston 80 slidably supported in the axial direction by a center piece 30 which is fixed to the front cover 3, a clutch drum 81, an annular clutch hub 82 fixed to an inner surface of a side wall portion 33 of the front cover 3 to oppose to the lockup piston 80, a plurality of first friction engagement plates (friction plates with a friction material on both surfaces) 83 engaged to splines formed on an inner circumference of the clutch drum 81, and a plurality of second friction engagement plates 84 (separator plates) engaged to splines formed on an outer circumference of the clutch hub 82.

Further, the lockup clutch 8 includes an annular flange member (oil chamber defining member) 85 attached to the center piece 30 of the front cover 3 to be disposed on the side opposite to the front cover 3 with respect to the lockup piston 80, that is, disposed on the side of the turbine runner 5 and the damper device 10 with respect to the lockup piston 80, and a plurality of return springs 86 disposed between the front cover 3 and the lockup piston 80. As illustrated in the drawing, the lockup piston 80 and the flange member 85 define an engagement oil chamber 87. Hydraulic oil (engagement hydraulic pressure) is supplied to the engagement oil chamber 87 from a hydraulic control device (not illustrated). Increasing the engagement hydraulic pressure for the engagement oil chamber 87 moves the lockup piston 80 in the axial direction such that the first and the second friction engagement plates 83 and 84 are pressed toward the front cover 3, which brings the lockup clutch 8 into engagement (complete engagement or slip engagement). A hydraulic single-plate clutch that includes a lockup piston to which a friction material is affixed may be adopted as the lockup clutch 8.

As shown in FIGS. 1 and 2, the damper device 10 includes a drive member (first rotational element) 11 or an input element, an intermediate member (second rotational element) 12 or an intermediate element and a driven member (third rotational element) 15 or an output element, as rotational elements that are housed by the housing defined by the front cover 3 and the pump impeller 4. The damper device 10 also includes a plurality of (for example, three in this embodiment) first springs (first elastic bodies) SP1 arranged to transmit the toque between the drive member 11 and the intermediate member 12, a plurality of (for example, three in this embodiment) second springs (second elastic bodies) SP2 arranged to respectively work in series with the corresponding first springs SP1 and to transmit the torque between the intermediate member 12 and the driven member 15, and a plurality of (for example, three in this embodiment) inner springs SPi arranged to transmit the torque between the drive member 11 and the driven member 15, as torque transmission elements (torque transmission elastic bodies) that are also housed by the housing defined by the front cover 3 and the pump impeller 4.

As shown in FIG. 1, the damper device 10 has a first torque transmission path TP1 and a second torque transmission path TP2 that are provided parallel to each other between the drive member 11 and the driven member 15. The first torque transmission path TP1 is configured by the plurality of first springs SP1, the intermediate member 12 and the plurality of second springs SP2 so as to transmit the torque between the drive member 11 and the driven member 15 via these elements. In this embodiment, coil springs having an identical specification (spring constant) are employed for the first and the second springs SP1 and SP2 of the first torque transmission path TP1.

The second torque transmission path TP2 is configured by the plurality of inner springs SPi so as to transmit the torque between the drive member 11 and the driven member 15 via the plurality of inner springs SPi that work parallel to one another. In this embodiment, the plurality of inner springs SPi of the second torque transmission path TP2 are arranged to work in parallel to the first and the second springs SP1 and SP2 of the first torque transmission path TP1, after an input torque into the drive member 11 reaches a predetermined torque (first threshold value) T1 and a torsion angle of the drive member 11 relative to the driven member 15 becomes equal to or larger than a predetermined angle θref. The damper device 10 accordingly has two-step (two-stage) damping characteristics. The torque T1 is set to be smaller than a torque T2 (second threshold value) corresponding to a maximum torsion angle θ max of the damper device 10.

In this embodiment, a linear coil spring made of a metal material that is spirally wound to have an axial center extended linearly at no load is employed for the first and the second springs SP1 and SP2 and the inner springs SPi. Compared with employing an arc coil spring, this more appropriately expands and contracts the first and the second springs SP1 and SP2 and the inner springs SPi along their axial centers and reduces a difference between a torque transmitted to the driven member 15 from the second springs SP2 and so on when a relative displacement between the drive member 11 and the driven member 15 increases and a torque transmitted to the driven member 15 from the second springs SP2 and so on when the relative displacement between the drive member 11 and the driven member 15 decreases, that is a hysteresis. The arc coil spring may, however, be employed for at least any of the first and the second springs SP1 and SP2 and the inner springs SPi.

Figure 3:
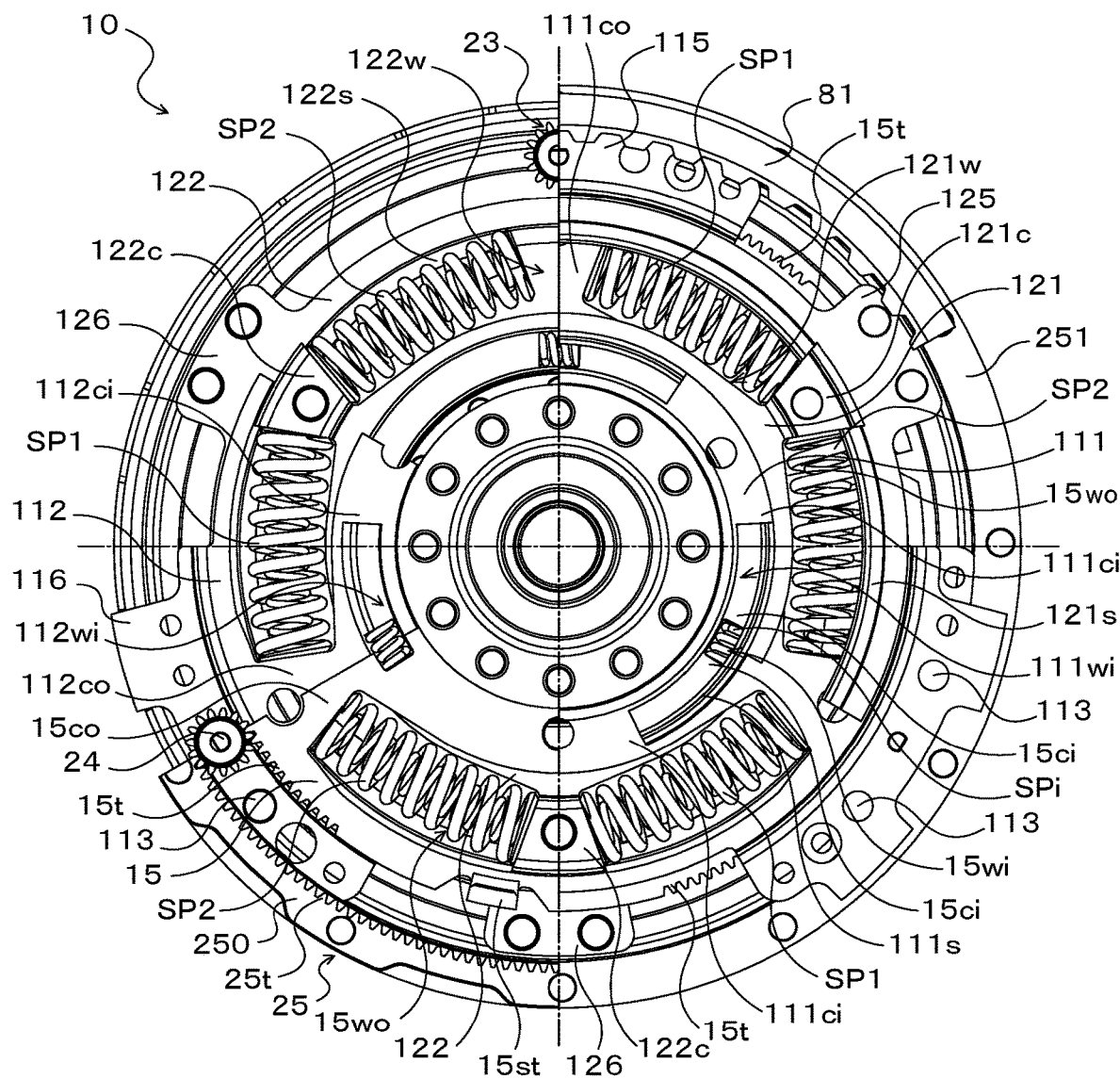
FIG. 3 is a front view illustrating the damper device of the starting device illustrated in FIGS. 1 and 2.

As shown in FIGS. 2 and 3, the drive member 11 of the damper device 10 includes an annular first input plate member (first rotational support member) 111 that is coupled with the clutch drum 81 of the lockup clutch 8 and is aligned by the damper hub 7, and an annular second input plate member (second rotational support member) 112 that is coupled with the first input plate member 111 by means of a plurality of rivets 113 or coupling members so as to be opposed with the first input plate member 111. Accordingly, the drive member 11, or the first and the second input plate members 111 and 112 rotate integrally with the clutch drum 81. Further, the front cover 3 (engine EG) is coupled with the drive member 11 of the damper device 10 by engagement of the lockup clutch 8. Therefore, when the lockup clutch 8 is engaged, the clutch drum 81 coupled with the first input plate member 111 as a carrier is connected to a plurality of the first friction engagement plates 83 via a spline. Additionally, when the lockup clutch 8 is engaged, a plurality of the first friction engagement plates 83 is connected to the front cover 3 by the lockup piston 80. That is, the first input plate member 111 is splined-engaged to the front cover 3 when the lockup clutch 8 is engaged.

In this embodiment, as shown in FIG. 2, the second input plate member 112 of the drive member 11 is connected with the turbine shell 50 of the turbine runner 5 via a turbine coupling member 55. The turbine coupling member 55 is an annular member fixed to the turbine shell 50 by means of welding. A plurality of (for example, three in this embodiment) engagement protrusions 55e are formed at intervals (at equal intervals) in the circumferential direction in the outer circumferential portion of the turbine coupling member 55 so as to respectively extend in the axial direction. Each of the engagement protrusions 55e is fitted into any one of a plurality of engagement recesses formed at intervals in the circumferential direction in the outer circumferential portion of the second input plate member 112. Thus, the drive member 11 and the turbine runner 5 are coupled with each other to be integrally rotated. Fitting the turbine runner 5 into the second input plate member 112 allows the entire device to be compact and the turbine runner 5 and the second input plate member 112 to be easily coupled with each other. The second input plate member 112 and the turbine runner 5 may be coupled with each other by means of rivets, for example.

As shown in FIGS. 2 and 3, the first input plate member 111 is configured to include a plurality of (for example, three in this embodiment) arc-shaped outer spring-accommodating windows 111wo arranged at intervals (at equal intervals) in the circumferential direction, a plurality of (for example, three in this embodiment) arc-shaped inner spring-accommodating windows 111wi arranged on an inner side in the radial direction of each outer spring-accommodating window 111wo at intervals (at equal intervals) in the circumferential direction, a plurality of (for example, three in this embodiment) spring support portions 111s respectively extending along an outer circumferential edge of each inner spring-accommodating window 111wi, a plurality of (for example, three in this embodiment) outer spring contact portions 111co, and a plurality of (for example, six in this embodiment) inner spring contact portions 111ci. The inner spring-accommodating windows 111wi respectively have a circumferential length longer than a natural length of the inner spring SPi (see FIG. 3). One outer spring contact portion 111co is disposed between the outer spring-accommodating windows 111wo arranged adjacent to each other in the circumferential direction. One inner spring contact portion 111ci is disposed on each side in the circumferential direction of each inner spring-accommodating window 111wi.

The second input plate member 112 is configured to include a plurality of (for example, three in this embodiment) arc-shaped outer spring-accommodating windows 112wo arranged at intervals (at equal intervals) in the circumferential direction, a plurality of (for example, three in this embodiment) arc-shaped inner spring-accommodating windows 112wi arranged on an inner side in the radial direction of each outer spring-accommodating window 112wo at intervals (at equal intervals) in the circumferential direction, a plurality of (for example, three in this embodiment) spring support portions 112s respectively extending along an outer circumferential edge of each inner spring-accommodating window 112wi, a plurality of (for example, three in this embodiment) outer spring contact portions 112co, and a plurality of (for example, six in this embodiment) inner spring contact portions 112ci. The inner spring-accommodating windows 112wi respectively have a circumferential length longer than the natural length of the inner spring SPi (see FIG. 3). One outer spring contact portion 112co is disposed between the outer spring-accommodating windows 112wo arranged adjacent to each other in the circumferential direction. One inner spring contact portion 112ci is disposed on each side in the circumferential direction of each inner spring-accommodating window 112wi. In this embodiment, the first and the second input plate members 111 and 112 have an identical shape so as to reduce the number of kinds of parts.

The intermediate member 12 includes a first intermediate plate member (first rotational member) 121 that is disposed on the front cover 3-side of the first input plate member 111 of the drive member 11, and a second intermediate plate member 122 that is disposed on the turbine runner 5-side of the second input plate member (second rotational member) 112 of the drive member 11 and coupled with the first intermediate plate member 121 by means of a plurality of rivets. As shown in FIG. 2, the first and the second input plate members 111 and 112 are disposed between the first intermediate plate member 121 and the second intermediate plate member 122 in the axial direction of the damper device 10. That is, the intermediate member 12 includes the annular first and second intermediate plate members 121 and 122 that are arranged on both sides of the drive member 11 and coupled with each other. This configuration enhances the flexibility in design of a moment of inertia of the intermediate member 12 by an adjustment of inner and outer diameters and thickness of the first and second intermediate plate members 121 and 122.

As shown in FIGS. 2 and 3, the first intermediate plate member 121 is configured to include a plurality of (for example, three in this embodiment) arc-shaped spring-accommodating windows 121w arranged at intervals (at equal intervals) in the circumferential direction, an annular spring support portion 121s extending along outer circumferential edges of the plurality of spring-accommodating windows 121w, and a plurality of (for example, three in this embodiment) spring contact portions 121c. One spring contact portion 121c is disposed between the spring-accommodating windows 121w arranged adjacent to each other in the circumferential direction. In this embodiment, an inner circumferential surface of the first intermediate plate 121 is supported from the inner side in the radial direction by the spring support portion 111s of the first input plate member 111 so that the first intermediate plate member 121 is aligned by the first input plate member 111. That is, the inner circumferential surface of the first intermediate plate 121 is supported by the spring support portion 111s which is close to the axial center of damper device 10. This configuration enables the first intermediate plate 121 to be aligned while reducing a frictional force accompanied with the alignment of the first intermediate plate 121.

The second intermediate plate member 122 is configured to include a plurality of (for example, three in this embodiment) arc-shaped spring-accommodating windows 122w arranged at intervals (at equal intervals) in the circumferential direction, an annular spring support portion 122s extending along outer circumferential edges of the plurality of spring-accommodating windows 122w, and a plurality of (for example, three in this embodiment) spring contact portions 122c. One spring contact portion 122c is disposed between the spring-accommodating windows 122w arranged adjacent to each other in the circumferential direction. In this embodiment, an inner circumferential surface of the second intermediate plate 122 is supported from the inner side in the radial direction by the spring support portion 112s of the second input plate member 112 so that the second intermediate plate member 122 is aligned by the second input plate member 112. That is, the inner circumferential surface of the second intermediate plate 122 is supported by the spring support portion 112s which is close to the axial center of damper device 10. This configuration enables the second intermediate plate 122 to be aligned while reducing a frictional force accompanied with the alignment of the second intermediate plate 122. In this embodiment, the first and the second intermediate plate members 121 and 122 have an identical shape so as to reduce the number of kinds of parts.

In this embodiment, the spring contact portions 121c and 122c of the first and the second intermediate plates 121 and 122 are opposed to each other in the axial direction and coupled with each other by means of rivets. Further, in this embodiment, the first intermediate plate 121 includes a plurality of (for example, three in this embodiment) coupling flange portions 125 arranged at intervals (at equal intervals) in the circumferential direction and located radially outside the spring contact portions 121c, as shown in FIGS. 2 and 3. The second intermediate plate 122 includes a plurality of (for example, three in this embodiment) coupling flange portions 126 arranged at intervals (at equal intervals) in the circumferential direction and located radially outside the spring contact portions 122c, as shown in FIGS. 2 and 3. The spring contact portions 121c and 122c of the first and the second intermediate plates 121 and 122 are opposed to each other in the axial direction and coupled with each other by means of rivets. Each of the coupling flange portions 125 of the first intermediate plate member 121 opposes to the corresponding coupling flange portion 126 of the second intermediate plate 122 in the axial direction. A pair of coupling flange portions 125 and 126 is coupled with each other by means of a plurality of (for example, two in this embodiment) rivets.

The driven member 15 is a plate-like annular member that is disposed between the first and the second input plate members 111 and 112 in the axial direction and fixed to the damper hub 7 by means of a plurality of rivets. As shown in FIGS. 2 and 3, the driven member 15 is configured to include a plurality of (for example, three in this embodiment) arc-shaped outer spring-accommodating windows 15wo arranged at intervals (at equal intervals) in the circumferential direction, a plurality of (for example, three in this embodiment) arc-shaped inner spring-accommodating windows 15wi arranged on an inner side in the radial direction of each outer spring-accommodating window 15wo at intervals (at equal intervals) in the circumferential direction, a plurality of (for example, three in this embodiment) outer spring contact portions 15co, and a plurality of (for example, six in this embodiment) inner spring contact portions 15ci. One outer spring contact portion 15co is disposed between the outer spring-accommodating windows 15wo arranged adjacent to each other in the circumferential direction. The inner spring-accommodating windows 15wi respectively have a circumferential length according to the natural length of the inner spring SPi. One inner spring contact portion 15ci is disposed on each side in the circumferential direction of each inner spring-accommodating window 15wi.

One first spring SP1 and one second spring SP2 are disposed in the outer spring-accommodating windows 111wo and 112wo of the first and the second input plate members 111 and 112 and outer spring-accommodating windows 15wo of the driven member 15, such that the first and the second springs SP1 and SP2 form a pair (to act in series). In the mounting state of the damper device 10, the outer spring contact portions 111co and 112co of the first and the second input plate members 111 and 112 and the outer spring contact portions 15co of the driven member 15 are respectively disposed between the first and the second springs SP1 and SP2 that are disposed in the different outer spring-accommodating windows 15wo, 111wo and 112wo not to form a pair (not to act in series), and come into contact with ends of the first and the second springs SP1 and SP2.

The spring contact portions 121c and 122c of the first and the second intermediate plate members 121 and 122 are respectively disposed between the common outer spring-accommodating windows 15wo, 111wo and 112wo to form a pair, and come into contact with ends of the first and the second springs SP1 and SP2. The first and the second springs SP1 and SP2 disposed in the different outer spring-accommodating windows 15wo, 111wo and 112wo not to form a pair (not to act in series) are disposed in the spring-accommodating windows 121w and 122w of the first and the second intermediate plate members 121 and 122. The first and the second springs SP1 and SP2 are supported (guided) from the outer side in the radial direction by the spring support portion 121s of the first intermediate plate member 121 on the front cover 3-side and the spring support portion 122s of the second intermediate plate member 122 on the turbine runner 5-side.

As shown in FIG. 3, the first and the second springs SP1 and SP2 are thus alternately arranged in the circumferential direction of the damper device 10. One end of each first spring SP1 comes into contact with the corresponding outer spring contact portions 111co and 112co of the drive member 11, and the other end of each first spring SP1 comes into contact with the corresponding spring contact portions 121c and 122c of the intermediate member 12. One end of each second spring SP2 comes into contact with the corresponding spring contact portions 121c and 122c of the intermediate member 12, and the other end of each second spring SP2 comes into contact with the corresponding outer spring contact portion 15co of the driven member 15.

As a result, the first and the second springs SP1 and SP2 forming a pair are connected with each other in series via the spring contact portions 121c and 122c of the intermediate member 12 between the drive member 11 and the driven member 15. Accordingly, the damper device 10 further reduces the rigidity of the elastic bodies arranged to transmit the torque between the drive member 11 and the driven member 15 or more specifically a combined spring constant of the first and the second springs SP1 and SP2. In this embodiment, as shown in FIG. 3, the plurality of first springs SP1 and the plurality of second springs SP2 are arranged on an identical circumference, such that the distance between the axial center of the starting device 1 or the damper device 10 and the axial center of each first spring SP1 is equal to the distance between the axial center of the starting device 1 and so on and the axial center of each second spring SP2.

The inner spring SPi is disposed in each of the inner spring-accommodating windows 15wi of the driven member 15. In the mounting state of the damper device 10, each of the inner spring contact portions 15ci comes into contact with a corresponding end of the inner spring SPi. In the mounting state of the damper device 10, a side of the each inner spring SPi on the front cover 3-side is located in a circumferential center of the corresponding inner spring-accommodating window 111wi of the first input plate member 111 and supported (guided) from the outer side in the radial direction by the spring support portion 111s of the first input plate member 111. In the mounting state of the damper device 10, a side of the each inner spring SPi on the turbine runner 5-side is located in a circumferential center of the corresponding inner spring-accommodating window 112wi of the second input plate member 112 and supported (guided) from the outer side in the radial direction by the spring support portion 112s of the second input plate member 112.

As shown in FIGS. 2 and 3, each of the inner springs SPi is arranged in an inner circumferential-side region in the fluid chamber 9 so as to be surrounded by the first and the second springs SP1 and SP2. This configuration further shortens the axial length of the damper device 10 and thereby the axial length of the starting device 1 and reduces a centrifugal force applied to the inner springs SPi so as to decrease a frictional force (sliding resistance) generated when each of the inner springs SPi are pressed against the spring supporting portions 111s and 112s and the driven member 15 by the centrifugal force. Each of the inner springs SPi comes into contact with one pair of the inner spring contact portions 111ci and 112ci disposed on the respective sides of the inner spring-accommodating windows 111wi and 112wi of the first and the second input plate members 111 and 112 when the input torque (drive torque) into the drive member 11 reaches the above torque T1.

Additionally, as shown in FIGS. 1 and 2, the damper device 10 includes a rotary inertia mass damper 20 that is housed by the housing defined by the front cover 3 and the pump impeller 4 and that is connected with the drive member 11 (first rotational element) and the driven member 15 (third rotational element) and is arranged parallel to both the first torque transmission path TP1 and the second torque transmission path TP2. In this embodiment, the rotary inertia mass damper 20 is configured to include a single pinion-type planetary gear 21 disposed between the drive member 11 or the input element of the damper device 10 and the driven member 15 or the output element of the damper device 10.

The planetary gear 21 is configured by the driven member 15 that includes a plurality of outer teeth gear portions 15t in an outer circumference thereof so as to work as a sun gear, the first and the second input plate members 111 and 112 that rotatably support a plurality of (for example, three in this embodiment) pinion gears 23 respectively engaging with the corresponding outer teeth gear portion 15t so as to work as a carrier, and a ring gear 25 that is disposed concentrically with the driven member 15 (outer teeth gear portions 15t) or the sun gear and has inner teeth 25t engaging with the each pinion gear 23. Accordingly, in the fluid chamber 9, the driven member 15 or the sun gear, the plurality of pinion gears 23 and the ring gear 25 at least partially overlap with the first and the second springs SP1 and SP2 (and inner springs SPi) in the axial direction as viewed in the radial direction of the damper device 10 (see FIG. 2).

As shown in FIG. 3, the outer teeth gear portions 15t are formed on a plurality of predetermined portions of an outer circumferential surface (outer circumferential portion) of the driven member 15 at intervals (at equal intervals) in the circumferential direction. As seen from FIG. 2, the outer teeth gear portions 15t are located radially outside the outer spring-accommodating window 15wo and the inner spring-accommodating window 15wi, that is, the first spring SP1, the second spring SP2 and the inner spring SPi that transmit the torque between the drive member 11 and the driven member 15. The outer teeth gear portion 15t may be formed on the entire outer circumference portion (outer circumferential surface) of the driven member 15.

As shown in FIGS. 2 and 3, the first input plate member 111 forming the carrier of the planetary gear 21 is configured to include a plurality of (for example, three in this embodiment) pinion gear supporting portions 115 disposed radially outside the outer spring contact portions 111co at intervals (at equal intervals) in the circumferential direction. Similarly, the second input plate member 112 forming the carrier of the planetary gear 21 is configured to include a plurality of (for example, three in this embodiment) pinion gear supporting portions 116 disposed radially outside the outer spring contact portions 112co at intervals (at equal intervals) in the circumferential direction, as shown in FIGS. 2 and 3.

Figure 4:
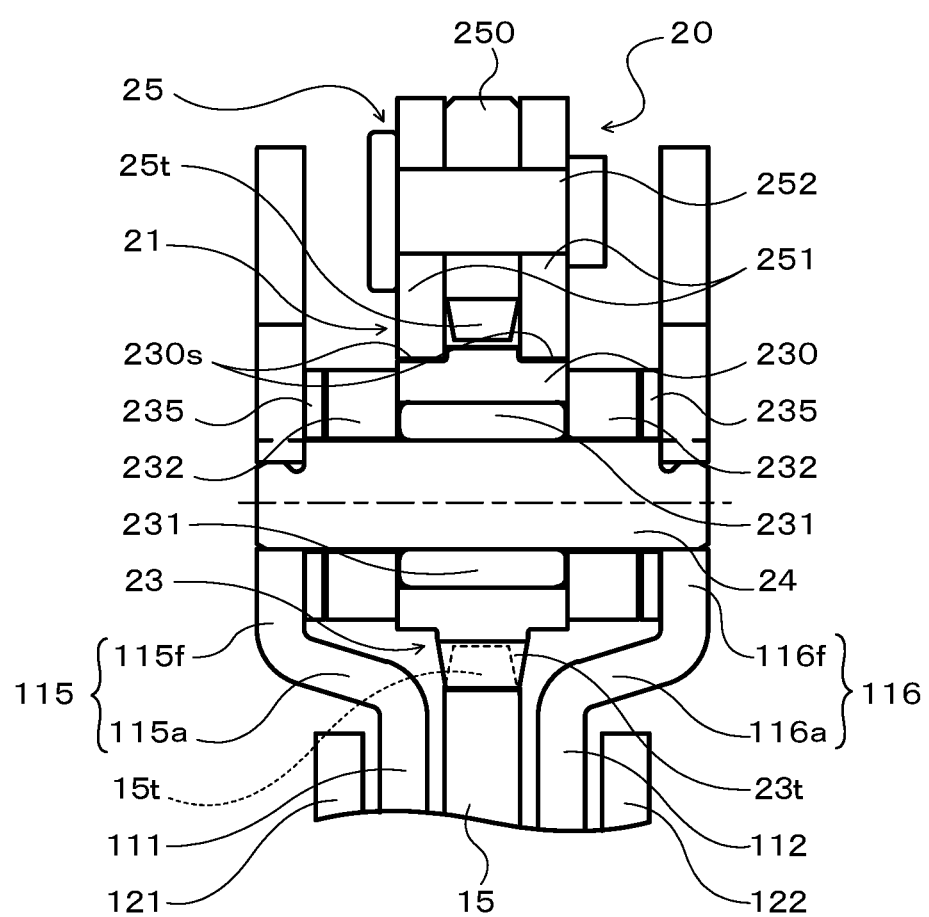
FIG. 4 is an enlarged sectional view illustrating a rotary inertia mass damper of the damper device according to the disclosure.

As shown in FIG. 4, each of the pinion gear supporting portions 115 of the first input plate member 111 is configured to include an arc-shaped axially extending portion 115a configured to axially protrude toward the front cover 3 and an arc-shaped flange portion 115f radially extended outward from an end of the axially extending portion 115a. Each of the pinion gear supporting portions 116 of the second input plate member 112 is configured to include an arc-shaped axially extending portion 116a configured to axially protrude toward the turbine runner 5 and an arc-shaped flange portion 116f radially extended outward from an end of the axially extending portion 116a. Each of the pinion gear supporting portions 115 (flange portion 115f) of the first input plate member 111 is opposed to the corresponding pinion gear supporting portions 116 (flange portion 116f) of the first input plate member 112 in the axial direction. The flange portions 115f and 116f forming a pair respectively support an end of a pinion shaft 24 inserted into the pinion gear 23.

As shown in FIG. 3, a pair of flange portions 115f and 116f is coupled with each other by means of a plurality of (for example, two in this embodiment) rivets 113. The pinion shafts are arranged on an identical circumference (identical diameter) together with the two rivets 113. This configuration secures rigidity of the first and the second input plate member 111 and 112 or the carrier. In this embodiment, the pinion gear supporting portions 115 (flange portions 115f) of the first input plate member 111 are fixed to the clutch drum 81 of the lockup clutch 8 by means of welding.

As shown in FIG. 4, the pinion gears 23 of the planetary gear 21 are configured to include an annular gear body 230 having gear teeth (outer teeth) 23t in an outer circumference thereof, a plurality of needle bearings 231 disposed between an inner circumferential surface of the gear body 230 and an outer circumferential surface of the pinion shaft 24, a pair of spacers 232 engaged to both ends of the gear body 230 so as to restricts an axial motion of the needle bearing 231. As shown in FIG. 4, the gear body 230 of the pinion gear 23 includes annular radially supporting portions 230s that respectively protrude outside an axial end of the gear teeth 23t in an inner side of bottoms of the gear teeth 23t in the radial direction of the pinion gear 23 and have a cylindrical outer circumferential surface. A diameter of an outer circumferential surface of each spacer 232 is identical to or smaller diameter than that of the radially supporting portion 230s.

The plurality of pinion gears 23 (pinion shafts 24) are supported at intervals (at equal intervals) in the circumferential direction by the first and the second input plate members 111 and 112 (pinion gear supporting portions 115 and 116) or the carrier. A washer 235 is disposed between a side face of each spacer 235 and the pinion gear supporting portion 115 or 116 (flange portion 115f or 116f) of the first or the second input plate member 111 or 112. As shown in FIG. 4, an axial gap is defined between both side faces of the gear teeth 23t of the pinion gear 23 and the pinion gear supporting portion 115 or 116 (flange portion 115f or 116f) of the first or the second input plate member 111 or 112.

The ring gear 25 of the planetary gear 21 is configured to include an annular gear body 250 having inner teeth 25t in an inner circumference thereof, two annular-shaped side plates 251, a plurality of rivets 252 for fixing the each side plate 251 to both axial side face of the gear body 250. The gear body 250, the two side plates 251 and the plurality of rivets 252 are integrated each other and work as a mass body of the rotary inertia mass damper 20. In this embodiment, the inner teeth 25t is formed on the entire inner circumference of the gear body 250. The inner teeth 25t may be formed on a plurality of predetermined portions of the inner circumferential surface of the gear body 250 at intervals (at equal intervals) in the circumferential direction. As shown in FIG. 3, recessed portions may be formed on an outer circumferential surface of the gear body 250 so as to adjust a weight of the ring gear 25.

Each of the side plates 251 has a concave cylindrically shaped inner circumferential surface and works as a supported portion that is axially supported by the plurality of pinion gears 23 engaging with the inner teeth 25t. That is, in both axial ends of the inner teeth 25t, the two side plates 251 are respectively fixed to the corresponding side face of the gear body 250 so as to protrude inside bottoms of the inner teeth 25t in the radial direction and oppose to at least the side face of the gear teeth 23t of the pinion gear 23. As shown in FIG. 4, in this embodiment, the inner circumferential surface of each side plate 251 is located slightly inside tips of the inner teeth 25t.

When each of the pinion gears 23 meshes with the inner teeth 25t, the inner circumferential surface of each side plate 251 is supported by the corresponding radially supporting portion 230s of the pinion gear 23 (gear body 230). This enables the ring gear 25 to be accurately aligned with respect to the axial center of the driven member 15 or the sun gear by the radially supporting portions 230s of the plurality of pinion gears 23 and to smoothly rotate (oscillate). Further, when each of the pinion gears 23 meshes with the inner teeth 25t, an inner face of each side plate 251 opposes to the side face of the gear teeth 23t of the pinion gear 23 and a side face of a portion from the bottoms of the gear teeth 23t to the radially supporting portion 230s. Accordingly, an axial motion of the ring gear 25 is restricted by at least the side face of the gear teeth 23t of the pinion gear 23. Further, as shown in FIG. 4, an axial gap is defined between an outer face of each side plate 251 of the ring gear 25 and the pinion gear supporting portion 115 or 116 (flange portion 115f or 116f) of the first or the second input plate member 111 or 112.

The damper device 10 further includes a stopper 17 configured to restrict a relative rotation between the drive member 11 and the driven member 15. In this embodiment, the stopper 17 includes a plurality of (for example, three in this embodiment) stopper contact portions 15st formed at intervals in the circumferential direction in the outer circumferential surface portion of the driven member 15 so as to contact with a portion of the drive member 11 in accordance with the relative rotation between the drive member 11 and the driven member 15. As seen from FIGS. 2 and 3, each of the stopper contact portions 15st is extended in the axial direction from an outer circumferential portion of the driven member 15 so as to be located between the adjacent outer teeth gear portions 15t in the circumferential direction and contact with a root portion of the axially extending portion 115a (see FIG. 4). In this embodiment, the outer circumferential portion of the driven member 15 may be bent toward the first input plate member 111 by pressing so as to form each of the stopper contact portions 15st. Each of the stopper contact portions 15st may be a dowel formed in the outer circumferential portion of the driven member 15 by pressing.

In the mounting state of the damper device 10, each of the stopper contact portions 15st of the driven member 15 is disposed in the vicinity of a center between two adjacent pinion gear support portions 115 (axially extending portions 115a) of the first input plate member 111 in the circumferential direction so as not to contact with the two adjacent pinion gear support portions 115. Each of the stopper contact portions 15st approaches the corresponding pinion gear support portion 115 of the first input plate member 111 in accordance with the relative rotation between the drive member 11 and the driven member 15 and comes into contact with the root portion of the corresponding axially extending portion 115a when the input torque reaches the above torque T2 corresponding to the maximum torsion angle θ max of the damper device 10. Thus, the stopper 17 restricts the relative rotation between the drive member 11 and the driven member 15 and the deflections of all of the springs SP1, SP2 and SPi.

When the lockup by the lockup clutch 8 is released in the starting device 1 with the configuration described above, as seen from FIG. 1, the torque (power) transmitted from the engine EG to the front cover 3 is transmitted to the input shaft IS of the transmission TM via the path of the pump impeller 4, the turbine runner 5, the drive member 11, the first springs SP1, the intermediate member 12, the second springs SP2, the driven member 15 and the damper hub 7. When the lockup is executed by the lockup clutch 8 of the starting device 1, on the other hand, the torque transmitted from the engine EG to the drive member 11 via the front cover 3 and the lockup clutch 8 is transmitted to the driven member 15 and the damper hub 7 via the first torque transmission path TP1 including the plurality of first springs SP1, the intermediate member 12 and the plurality of second springs SP2, and the rotary inertia mass damper 20 until the input torque reaches the above torque T1. When the input torque becomes equal to or higher than the above torque T1, the torque transmitted to the drive member 11 is transmitted to the driven member 15 and the damper hub 7 via the first torque transmission path TP1, the second torque transmission path TP2 including the plurality of inner springs SPi, and the rotary inertia mass damper 20 until the input torque reaches the above torque T2.

When the drive member 11 is rotated (twisted) relative to the driven member 15 under an execution of the lockup (engagement of the lockup clutch 8), the first and the second springs SP1 and SP2 are deflected, and the ring gear 25 or the mass body is rotated (oscillated) about the axial center in accordance with relative rotation between the drive member 11 and the driven member 15. More specifically, when the drive member 11 is rotated (oscillated) relative to the driven member 15, the rotation speed of the drive member 11 (first and the second input plate members 111 and 112) or the carrier which is an input element of the planetary gear 21 becomes higher than the rotation speed of the driven member 15 or the sun gear. In such a state, the rotation speed of the ring gear 25 is increased by the action of the planetary gear 21, so that the ring gear 25 is rotated at a higher rotation speed than the rotation speed of the drive member 11. This causes an inertia torque to be applied from the ring gear 25 that is the mass body of the rotary inertia mass damper 20 to the driven member 15 that is the output element of the damper device 10 via the pinion gears 23 and thereby damps the vibration of the driven member 15. The rotary inertia mass damper 20 is configured to mainly transmit the inertia torque between the drive member 11 and the driven member 15 but not to transmit an average torque.

When the input torque into the drive member 11 becomes equal to or higher than the above torque T2, the stopper 17 restricts the relative rotation between the drive member 11 and the driven member 15 and the deflections of all of the springs SP1, SP2 and SPi. This prevents an excessive load including the inertia torque from the rotary inertia mass damper 20 from acting on the first and the second springs SP1, SP2 and the inner springs SPi, thereby satisfactorily protecting these members.

The following describes a design procedure of the damper device 10.

As described above, in the damper device 10, until the input torque transmitted to the drive member 11 reaches the above torque T1, the first and the second springs SP1 and SP2 included in the first torque transmission path TP1 work in parallel to the rotary inertia mass damper 20. When the first and the second springs SP1 and SP2 work in parallel to the rotary inertia mass damper 20, the torque transmitted from the first torque transmission path TP1 including the intermediate member 12 and the first and the second springs SP1 and SP2 to the driven member 15 depends on (is proportional to) the displacement (amount of deflection or torsion angle) of the second springs SP2 between the intermediate member 12 and the driven member 15. The torque transmitted from the rotary inertia mass damper 20 to the driven member 15, on the other hand, depends on (is proportional to) a difference in angular acceleration between the drive member 11 and the driven member 15, i.e., a second order differential equation result of the displacement of the first and the second springs SP1 and SP2 between the drive member 11 and the driven member 15. On the assumption that the input torque transmitted to the drive member 11 of the damper device 10 is periodically vibrated as shown by Equation (1) given below, the phase of the vibration transmitted from the drive member 11 to the driven member 15 via the first torque transmission path TP1 is accordingly shifted by 180 degrees from the phase of the vibration transmitted from the drive member 11 to the driven member 15 via the rotary inertia mass damper 20.

[Math. 1]

$$T = T_0 \sin \omega t \qquad (1)$$

Additionally, in the damper device 10 including the intermediate member 12, two resonances can be set in a state where the deflections of the first and the second springs SP1 and SP2 are allowed and the inner springs SPi are not deflected. That is, on the assumption that a torque transmission from the engine EG to the drive member 11 starts in a state where the lockup is executed by the lockup clutch 8 of the starting device 1, a resonance caused by the vibrations of the drive member 11 and the driven member 15 in the opposite phases or a resonance (first resonance, see a resonance point R1 in FIG. 5) of mainly the transmission TM between the drive member 11 and drive shafts (not shown) occurs in the first torque transmission path TP1 when the deflections of the first and the second springs SP1, SP2 are allowed and the inner springs SPi are not deflected.

Further, the intermediate member 12 of the first torque transmission path TP1 is formed in an annular shape. This causes the inertia force applied to the intermediate member 12 to be greater than the resistance force of interfering with vibration of the intermediate member 12 (frictional force caused by the centrifugal force mainly applied to the rotating intermediate member 12) in the process of transmitting the torque from the engine EG to the drive member 11. Accordingly, a damping ratio $\zeta$ of the intermediate member 12 that is vibrated with transmission of the torque from the engine EG to the drive member 11 becomes less than a value 1. The damping ratio $\zeta$ of the intermediate member 12 in a single-degree-of-freedom system may be expressed as $\zeta=C/(2\cdot\sqrt{(J_2\cdot(k_1+k_2))}$. Herein "$J_2$" denotes a moment of inertia of the intermediate member 12 (total moment of inertia of the intermediate member 12 and the turbine runner 5 according to this embodiment), "$k_1$" denotes a combined spring constant of the plurality of first springs SP1 working in parallel between the drive member 11 and the intermediate member 12, "$k_2$" denotes a combined spring constant of the plurality of second springs SP2 working in parallel between the intermediate member 12 and the driven member 15, and "C" denotes a damping force (resistance fore) per unit speed of the intermediate member 12 that interferes with the vibration of the intermediate member 12. Accordingly the damping ratio $\zeta$ of the intermediate member 12 is determined based on at least the moment of inertia $J_2$ of the intermediate member 12 and the rigidities $k_1$ and $k_2$ of the first and the second springs SP1 and SP2.

The above damping force C may be determined by a procedure given below. When a displacement x of the intermediate member 12 is expressed as $x=A\cdot\sin(\omega_{12}\cdot t)$, a loss energy Sc by the above damping force C may be expressed as $Sc=\pi\cdot C\cdot A^2\cdot\omega_{12}$ (where "A" denotes an amplitude and "$\omega_{12}$" denotes a vibration frequency of the intermediate member 12). Additionally, when the displacement x of the intermediate member 12 is expressed as $x=A\cdot\sin(\omega_{12}\cdot t)$, a loss energy Sh by the above hysteresis H in one cycle vibration of the intermediate member 12 may be expressed as $Sh=2\cdot H\cdot A$. On the assumption that the loss energy Sc by the above damping force C is equal to the loss energy Sh by the hysteresis H, the above damping force C may be expressed as $C=(2\cdot H)/(\pi\cdot A\cdot\omega_{12})$.

Figure 5:
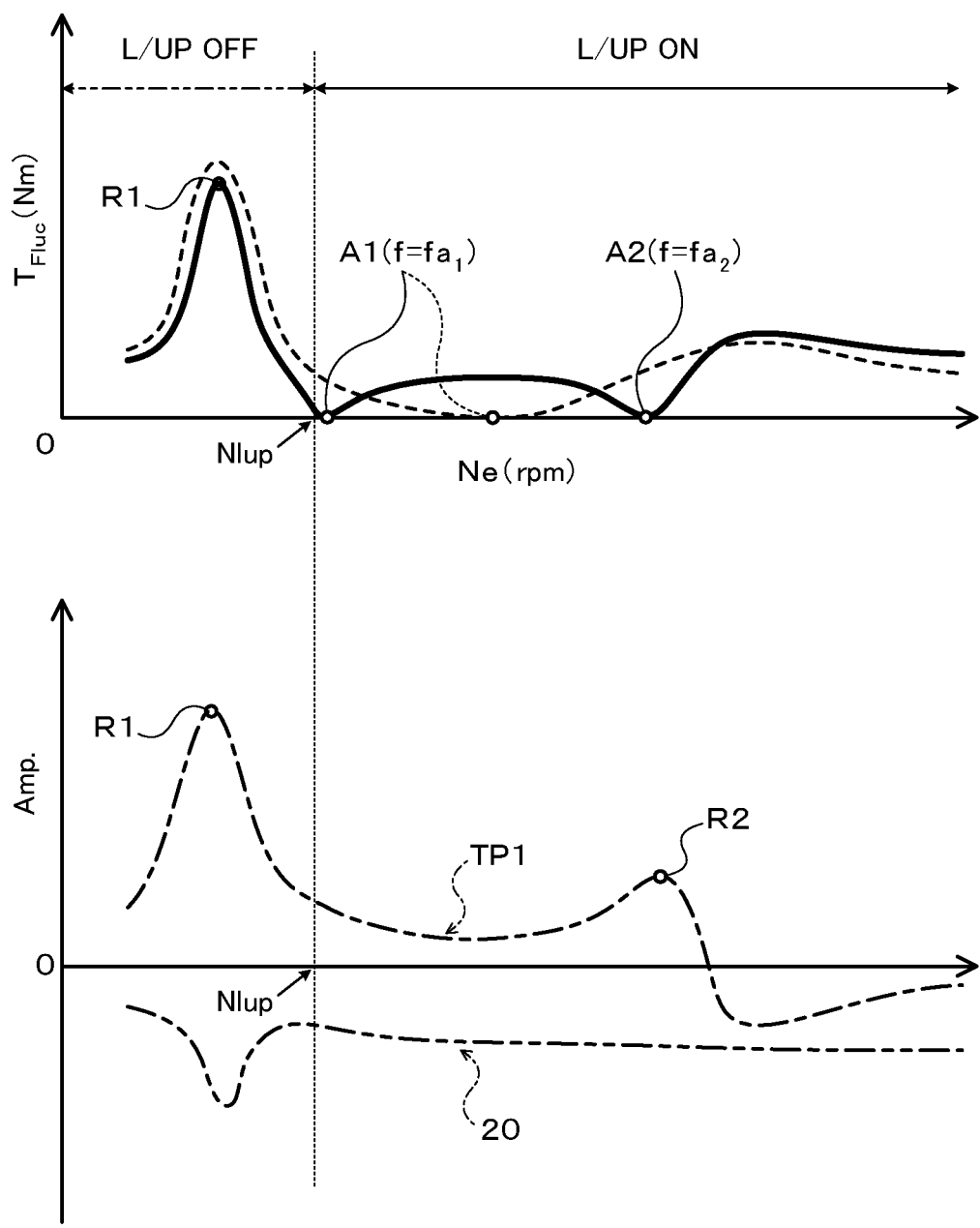
FIG. 5 is a diagram illustrating a relationship of rotation speed of an engine to torque variation $T_{Fluc}$ at an output element in the damper device according to the disclosure.

Additionally, a natural frequency $f_{12}$ of the intermediate member 12 in the single-degree-of-freedom system is expressed as $f_{12}=\frac{1}{2}\pi\cdot\sqrt{((k_1+k_2)/J_2)}$. Forming the intermediate member 12 in an annular shape relatively increases the moment of inertia $J_2$, so that the natural frequency $f_{12}$ of the intermediate member 12 relatively decreases. Accordingly, as shown in FIG. 5, in the state that the deflections of the first and the second springs SP1 and SP2 are allowed and the outer springs SPo are not deflected, the resonance of the intermediate member 12 (second resonance, see a resonance point R2 in FIG. 5) by the vibration of the intermediate member 12 in the opposite phase to those of the drive member 11 and the driven member 15 occurs in the first torque transmission path TP1 at the stage when the rotation speed of the drive member 11 reaches a rotation speed corresponding to the greater between the two natural frequencies, i.e., at a higher rotation speed (higher frequency) than the first resonance.

In order to further improve the vibration damping effect of the damper device 10 with the above characteristics, as the result of intensive studies and analyses, the inventors have noted that the damper device 10 can damp the vibration of the driven member 15 by making the amplitude of the vibration of the first torque transmission path TP1 equal to the amplitude of the vibration of the rotary inertia mass damper 20 in the opposite phase. The inventors have established an equation of motion as shown by Equation (2) given below in a vibration system including the damper device 10 in which the torque is transmitted from the engine EG to the drive member 11 under engagement of the lockup clutch and the inner springs SPi are not deflected. In Equation (2), "$J_1$" denotes a moment of inertia of the drive member 11, "$J_2$" denotes a moment of inertia of the intermediate member 12 as described above, "$J_3$" denotes a moment of inertia of the driven member 15, and "$J_i$" denotes a moment of inertia of the ring gear 25 that is the mass body of the rotary inertia mass damper 20. Further, "$\theta_1$" denotes a torsion angle of the drive member 11, "$\theta_2$" denotes a torsion angle of the intermediate member 12, "$\theta_3$" denotes a torsion angle of the driven member 15. "$\lambda$" denotes a gear ratio of the planetary gear 21 (a pitch circle diameter of the outer teeth gear portion 15t (sun gear)/a pitch circle diameter of the inner teeth 25t of the ring gear 25) included in the rotary inertia mass damper 20, that is, a ratio of a rotational speed of the ring gear 25 or the mass body with respect to a rotational speed of the driven member 15.

[Math. 2]

$$\begin{bmatrix} J_1 + J_i\cdot(1+\lambda)^2 & 0 & -J_i\cdot\lambda\cdot(1+\lambda) \\ 0 & J_2 & 0 \\ -J_i\cdot\lambda\cdot(1+\lambda) & 0 & J_3 + J_i\cdot\lambda^2 \end{bmatrix}\begin{bmatrix} \ddot{\theta}_1 \\ \ddot{\theta}_2 \\ \ddot{\theta}_3 \end{bmatrix} + \begin{bmatrix} k_1 & -k_1 & 0 \\ -k_1 & k_1+k_2 & -k_2 \\ 0 & -k_2 & k_2 \end{bmatrix}\begin{bmatrix} \theta_1 \\ \theta_2 \\ \theta_3 \end{bmatrix} = \begin{bmatrix} T \\ 0 \\ 0 \end{bmatrix} \quad (2)$$

Additionally, the inventors have assumed that the input torque T is periodically vibrated as shown by Equation (1) given above and have also assumed that the torsion angle $\theta_1$ of the drive member 11, the torsion angle $\theta_2$ of the intermediate member and the torsion angle $\theta_3$ of the driven member 15 are periodically responded (vibrated) as shown by Equation (3) given below. In Equations (1) and (3), "$\omega$" denotes an angular frequency in the periodical fluctuation (vibration) of the input torque T. In Equation (3), "$\Theta_1$" denotes an amplitude of the vibration (vibration amplitude, i.e., maximum torsion angle) of the drive member 11 generated during transmission of the torque from the engine EG, "$\Theta_2$" denotes an amplitude of vibration (vibration amplitude) of the intermediate member 12 generated during transmission of the torque from the engine EG to the drive member 11, and "$\Theta_3$" denotes an amplitude of vibration (vibration amplitude) of the driven member 15 generated during transmission of the torque from the engine EG to the drive member 11. On such assumptions, an identity of Equation (4) given below is obtained by substituting Equations (1) and (3) into Equation (2) and eliminating "sin ωt" from both sides.

[Math. 3]

$$\begin{bmatrix} \theta_1 \\ \theta_2 \\ \theta_3 \end{bmatrix} = \begin{bmatrix} \Theta_1 \\ \Theta_2 \\ \Theta_3 \end{bmatrix} \sin\omega t \qquad (3)$$

$$\begin{bmatrix} T_1 \\ 0 \\ 0 \end{bmatrix} = \begin{bmatrix} k_1 - \omega^2\{J_1 + J_i \cdot (1+\lambda)^2\} & -k_1 & \omega^2 \cdot J_i \cdot \lambda \cdot (1+\lambda) \\ -k_1 & k_1 + k_2 - \omega^2 \cdot J_2 & -k_2 \\ \omega^2 \cdot J_i \cdot \lambda \cdot (1+\lambda) & -k_2 & k_2 - \omega^2(J_3 + J_i \cdot \lambda^2) \end{bmatrix} \begin{bmatrix} \Theta_1 \\ \Theta_2 \\ \Theta_3 \end{bmatrix} \qquad (4)$$

In Equation (4), when the vibration amplitude $\theta_3$ of the driven member 15 is zero, this means that the vibration from the engine EG is theoretically damped completely by the damper device 10 and that no vibration is theoretically transmitted to the transmission TM, the driveshaft and so on located downstream of the driven member 15. From this point of view, the inventors have obtained a conditional expression of Equation (5) by solving the identity of Equation (4) with respect to the vibration amplitude $\Theta_3$ and setting $\Theta_3=0$. Equation (5) is a quadratic equation with regard to the square of angular frequency $\omega^2$ in the periodical fluctuation of the input torque T. When the square of angular frequency $\omega^2$ is either of two real roots (or multiple root) of Equation (5), the vibration from the engine EG transmitted from the drive member 11 to the driven member 15 via the first torque transmission path TP1 and the vibration transmitted from the drive member 11 to the driven member 15 via the rotary inertia mass damper 20 are cancelled out each other, and the vibration amplitude $\Theta_3$ of the driven member 15 theoretically becomes equal to zero.

[Math. 4]

$$J_2 \cdot J_i \cdot \lambda(1+\lambda) \cdot (\omega^2)^2 - J_i \cdot \lambda(1+\lambda) \cdot (k_1+k_2) \cdot \omega^2 + k_1 \cdot k_2 = 0 \qquad (5)$$

This result of analysis indicates that a total of two antiresonance points (A1 and A2 in FIG. 5) providing theoretically zero vibration amplitude $\theta_3$ of the driven member 15 may be set in the damper device 10 that includes the intermediate member 12 and accordingly provides two peaks, i.e., a resonance in the torque transmitted via the first torque transmission path TP1 as shown in FIG. 5. The damper device 10 can thus significantly effectively damp the vibration of the driven member 15 by making the amplitude of the vibration of the first torque transmission path TP1 equal to the amplitude of the vibration of the rotary inertia mass damper 20 in the opposite phase at two points corresponding to the two resonances occurring in the first torque transmission path TP1.

Additionally, in the damper device 10, the resonance of the intermediate member 12 occurs in the stage where the rotation speed of the drive member 11 becomes rather higher than a rotation speed corresponding to the frequency at an antiresonance point A1 of a lower rotation speed side (lower frequency side). The amplitude of the vibration transmitted from the second springs SP2 to the driven member 15 changes from decreasing to increasing before the rotation speed of the drive member 11 (engine EG) reaches a rotation speed corresponding to the relatively low natural frequency of the intermediate member 12, as shown by a one-dot chain line curve in FIG. 5. Even when the amplitude of the vibration transmitted from the rotary inertia mass damper 20 to the driven member 15 is gradually increased with an increase in rotation speed of the drive member 11 (as shown by a two-dot chain line curve in FIG. 5), this expands an area where the vibration transmitted from the rotary inertia mass damper 20 to the driven member 15 cancels out at least part of the vibration transmitted from the second springs SP2 to the driven member 15. This results in further improving the vibration damping performance of the damper device 10 in a relatively low rotation speed range of the drive member 11.

A vehicle equipped with the engine EG as the source of generating power for driving may be configured as to further decrease a lockup rotation speed Nlup of the lockup clutch 8 (rotation speed at the time of first coupling of the engine EG with the damper device 10 after a start of the engine EG and the lowest among a plurality of lockup rotation speeds; in other words, minimum rotation speed in a rotation speed range where the torque is transmitted from the drive member 11 through the torque transmission path TP1 to the driven member 15) and mechanically transmit the torque from the engine EG to the transmission TM at an earlier timing, so as to improve the power transmission efficiency between the engine EG and the transmission TM and thereby further improve the fuel consumption of the engine EG. The vibration transmitted from the engine EG via the lockup clutch 8 to the drive member 11, however, increases in a low rotation speed range of approximately 500 rpm to 1500 rpm that is likely to be set as a range of the lockup rotation speed Nlup. The vibration level significantly increases especially in a vehicle equipped with a smaller-number cylinder engine such as three-cylinder engine or four-cylinder engine. Accordingly, in order to suppress transmission of a large vibration to the transmission TM and so on during or immediately after engagement the lockup, there is a need to further reduce the vibration level in a rotation speed range of about the lockup rotation speed Nlup of the entire damper device 10 (driven member 15) arranged to transmit the torque (vibration) from the engine EG to the transmission TM under engagement of the lockup.

By taking into account the foregoing, the inventors have configured the damper device 10 so as to form the antiresonance point A1 of the lower rotation speed side (lower frequency side) when the rotation speed Ne of the engine EG is in the range of 500 rpm to 1500 rpm (in the expected setting range of the lockup rotation speed Nlup), based on the predetermined lockup rotation speed Nlup of the lockup clutch 8. Two solutions $\omega_1$ and $\omega_2$ of Equation (5) given above may be obtained as Equations (6) and (7) given below according to the quadratic formula, and satisfy $\omega_1 < \omega_2$. A frequency $fa_1$ at the antiresonance point A1 of the lower rotation speed side (lower frequency side) (hereinafter referred to as "minimum frequency") is expressed by Equation (8) given below, and a frequency $fa_2$ at an antiresonance point A2 of the higher rotation speed side (higher frequency side) ($fa_2 > fa_1$) is expressed by Equation (9) given below. A rotation speed $Nea_1$ of the engine EG corresponding to the minimum frequency $fa_1$ is expressed as $Nea_1 = (120/n) \cdot fa_1$, where "n" denotes the number of cylinders of the engine EG.

[Math. 5]

$$\omega_1^2 = \frac{(k_1 + k_2) - \sqrt{(k_1 + k_2)^2 - 4 \cdot \frac{J_2}{J_i} \cdot k_1 \cdot k_2 \cdot \frac{1}{\lambda(1+\lambda)}}}{2 \cdot J_2} \quad (6)$$

$$\omega_2^2 = \frac{(k_1 + k_2) + \sqrt{(k_1 + k_2)^2 - 4 \cdot \frac{J_2}{J_i} \cdot k_1 \cdot k_2 \cdot \frac{1}{\lambda(1+\lambda)}}}{2 \cdot J_2} \quad (7)$$

$$fa_1 = \frac{1}{2\pi} \sqrt{\frac{(k_1 + k_2) - \sqrt{(k_1 + k_2)^2 - 4 \cdot \frac{J_2}{J_i} \cdot k_1 \cdot k_2 \cdot \frac{1}{\lambda(1+\lambda)}}}{2 \cdot J_2}} \quad (8)$$

$$fa_2 = \frac{1}{2\pi} \sqrt{\frac{(k_1 + k_2) + \sqrt{(k_1 + k_2)^2 - 4 \cdot \frac{J_2}{J_i} \cdot k_1 \cdot k_2 \cdot \frac{1}{\lambda(1+\lambda)}}}{2 \cdot J_2}} \quad (9)$$

Accordingly, the combined spring constant $k_1$ of the plurality of first springs SP1, the combined spring constant $k_2$ of the plurality of second springs SP2, the moment of inertia $J_2$ of the intermediate member 12, and the moment of inertia $J_i$ of the ring gear 25 that is the mass body of the rotary inertia mass damper 20 are selected and set in the damper device 10, in order to satisfy Expression (10) given below. More specifically, in the damper device 10, the spring constants $k_1$ and $k_2$ of the first and the second springs SP1 and SP2, the moment of inertia $J_2$ of the intermediate member 12, the moment of inertia $J_i$ of the ring gear 25, and the gear ratio $\lambda$ of the planetary gear 21 are determined, based on the above minimum frequency $fa_1$ (and the lockup rotation speed Nlup). When designing the damper device 10, a moment of the inertia of the pinion gear 23 may be ignored in practice as shown in Equations (2)-(9) and may be taken into account in the above equation (2) and so on. Further, the spring constants $k_1$ and $k_2$ of the first and the second springs SP1 and SP2, the moment of inertia $J_2$ of the intermediate member 12, the moment of inertia $J_i$ of the ring gear 25, the gear ratio $\lambda$ of the planetary gear 21, and the moment of the inertia of the pinion gear 23 may be determined, based on the above minimum frequency $fa_1$ (and the lockup rotation speed Nlup).

[Math. 6]

$$500 \text{ rpm} \le \frac{120}{n} fa_1 \le 1500 \text{ rpm} \quad (10)$$

As described above, the antiresonance point A1 of the lower rotation speed side that is likely to provide theoretically zero vibration amplitude $\Theta_3$ of the driven member 15 (that is likely to further decrease the vibration amplitude $\Theta_3$) may be set in the low rotation speed range of 500 rpm to 1500 rpm (in the expected setting range of the lockup rotation speed Nlup). This enables one resonance having the lower frequency (first resonance) out of the resonances occurring in the first torque transmission path TP1 to be shifted toward the lower rotation speed (toward the lower frequency) as shown in FIG. 5, so as to be included in a non-lockup area of the lockup clutch 8 (shown by the two-dot chain line curve in FIG. 5). Thus, the lockup (coupling of the engine EG with the drive member 11) at the lower rotation speed.

When the damper device 10 is configured to satisfy Expression (10), it is preferable to select and set the spring constants $k_1$ and $k_2$ and the moments of inertia $J_2$ and $J_i$, so as to minimize the frequency of the lower rotation-speed (lower-frequency) side resonance (at a resonance point R1) occurring in the first torque transmission path TP1 to the minimum possible value that is lower than the above minimum frequency $fa_1$. This further reduces the minimum frequency $fa_1$ and allows for the lockup at the further lower rotation speed.

Moreover, the configuration capable of setting two antiresonance points A1 and A2 enables the antiresonance point A1 having the minimum frequency ($fa_1$) between the two antiresonance points A1 and A2 to be shifted toward the lower frequency side, compared with the configuration that only one antiresonance point is set (shown by a broken line curve in FIG. 5). Additionally, as seen from FIG. 5, the configuration that the two antiresonance points A1 and A2 are set enables the vibration from the engine EG transmitted from the drive member 11 to the driven member 15 via the first torque transmission path TP1 (shown by the one-dot chain line curve in FIG. 5) to be effectively damped by the vibration transmitted from the drive member 11 to the driven member 15 via the rotary inertia mass damper 20 (shown by the two-dot chain line curve in FIG. 5) in a relatively wide rotation speed range between the two antiresonance points A1 and A2.

This further improves the vibration damping effect of the damper device 10 in the lower rotation speed range of a lockup area that is likely to increase the vibration from the engine EG. In the damper device 10, on the occurrence of the second resonance (resonance as shown by the resonance point R2 in FIG. 5), the intermediate member 12 is vibrated in the opposite phase to that of the driven member 15. As shown by the one-dot chain line curve in FIG. 5, the phase of the vibration transmitted from the drive member 11 to the driven member 15 via the first torque transmission path TP1 becomes identical with the phase of the vibration transmitted from the drive member 11 to the driven member 15 via the rotary inertia mass damper 20.

In the damper device 10 configured as described above, in order to further improve the vibration damping performance around the lockup rotation speed Nlup, there is a need to appropriately separate the lockup rotation speed Nlup and the rotation speed Ne of the engine EG corresponding to the resonance point R2. Accordingly, when the damper device 10 is configured to satisfy Expression (10), it is preferable to select and set the spring constants $k_1$ and $k_2$ and the moments of inertia $J_2$ and $J_i$, so as to satisfy Nlup $\le (120/n) \cdot fa_1$ ($=Nea_1$). This engages the lockup by the lockup clutch 8, while effectively suppressing transmission of the vibration to the input shaft IS of the transmission TM. This also enables the vibration from the engine EG to be remarkably effectively damped by the damper device 10, immediately after engagement of the lockup.

As described above, designing the damper device 10 based on the frequency (minimum frequency) $fa_1$ at the antiresonance point A1 remarkably effectively improves the vibration damping performance of the damper device 10. According to the inventors' studies and analyses, it has been confirmed that when the lockup rotation speed Nlup is set to, for example, a value of about 1000 rpm, the damper device 10 configured to satisfy, for example, 900 rpm≤(120/n)·$f_{a1}$≤1200 rpm provides the remarkably effective results in practice.

Further, the drive member 11 of the damper device 10 includes the first and the second input plate members 111 and 112 or the carrier, that are coupled with each other so as to be opposed to each other in the axial direction of the damper device 10 and rotatably support the plurality of pinion gears 23 of the planetary gear 21. The driven member 15 includes the plurality of outer teeth gear portions 15t that respectively mesh with the corresponding pinion gear 23 in the outer circumferential portion (outer circumferential surface) thereof and is disposed between the first and the second input plate members 111 and 112 in the axial direction so as to work as the sun gear. Further, the damper device 10 includes the stopper 17 configured to restrict the relative rotation between the drive member 11 and the driven member 15. The stopper 17 includes the stopper contact portions 15st arranged in the outer circumferential portion of the driven member 15 so as to contact with the portion of the drive member 11 or the first input plate member 111 in accordance with the relative rotation between the drive member 111 and the driven member 15.

Thus, the relative rotation between the drive member 11 and the driven member 15 is restricted so as to prevent the excessive load including the inertia torque from the rotary inertia mass damper 20 from acting on the first and the second springs SP1 and SP2 and the inner springs SPi when a larger torque is transmitted between the drive member 11 and the driven member 15, thereby satisfactorily protecting these members. Further, the stopper contact portions 15st are arranged in the outer circumferential portion of the driven member 15 or the sun gear so as to make a distance from the axial center of the damper device 10 to the stopper contact portion 15st closer to a distance from the axial center of the damper device 10 to a support portion of the pinion gear 23 or an axial center of the pinion shaft 24 in the first and the second input plate members 111 and 112. This decreases moment acting on the drive member 11 that supports the plurality of pinion gears 23 and prevents deformation and so on of the drive member 11 when the stopper contact portions 15st contact with the first input plate member 111 so as to restrict the relative rotation between the drive member 11 and the driven member 15. Accordingly, the durability of the damper device 10 with the rotary inertia mass damper 20 can be improved.

The driven member 15 includes the plurality of outer teeth gear portions 15t arranged at intervals in the circumferential direction in the outer circumferential portion (outer circumferential surface) thereof. The plurality of contact portions 15st are arranged in the outer circumferential portion of the driven member 15 so as to be located between the adjacent outer teeth gear portions 15t in the circumferential direction. That is, in the driven member 15 or the sun gear of the planetary gear 21 included in the rotary inertia mass damper 20, each of the outer teeth gear portions 15t may be formed in a range corresponding to a moving range of each pinion gear 23 and is not necessarily required to be formed in the entire outer circumferential portion of the driven member 15. Accordingly, when the plurality of outer teeth gear portions 15t are arranged at intervals in the circumferential direction in the outer circumferential portion of the driven member 15, the stopper contact portions 15st may be respectively located between the adjacent outer teeth gear portions 15t in the circumferential direction so as to suppress overall size expansion and complication of a structure of the drive member 11, the driven member 15 and the damper device 10 even if the stopper contact portions 15st are arranged in the driven member 15.

The stopper contact portions 15st are respectively configured to extend in the axial direction from the outer circumferential portion of the driven member 15 so as to be capable of contacting with one of the first and the second input plate members 111 and 112 or the vicinity of the axially extending portion 115a of the first input plate member 111. This satisfactorily suppresses overall size expansion and complication of the structure of the drive element 11, the driven member 15 and the damper device 10 even if the stopper contact portions 15st are arranged in the driven member 15. The stopper contact portions 15st may be respectively configured to extend in the axial direction from the outer circumferential portion of the driven member 15 so as to be capable of contacting with the second input plate member 112 (the vicinity of the axially extending portion 116a).

Figure 6:
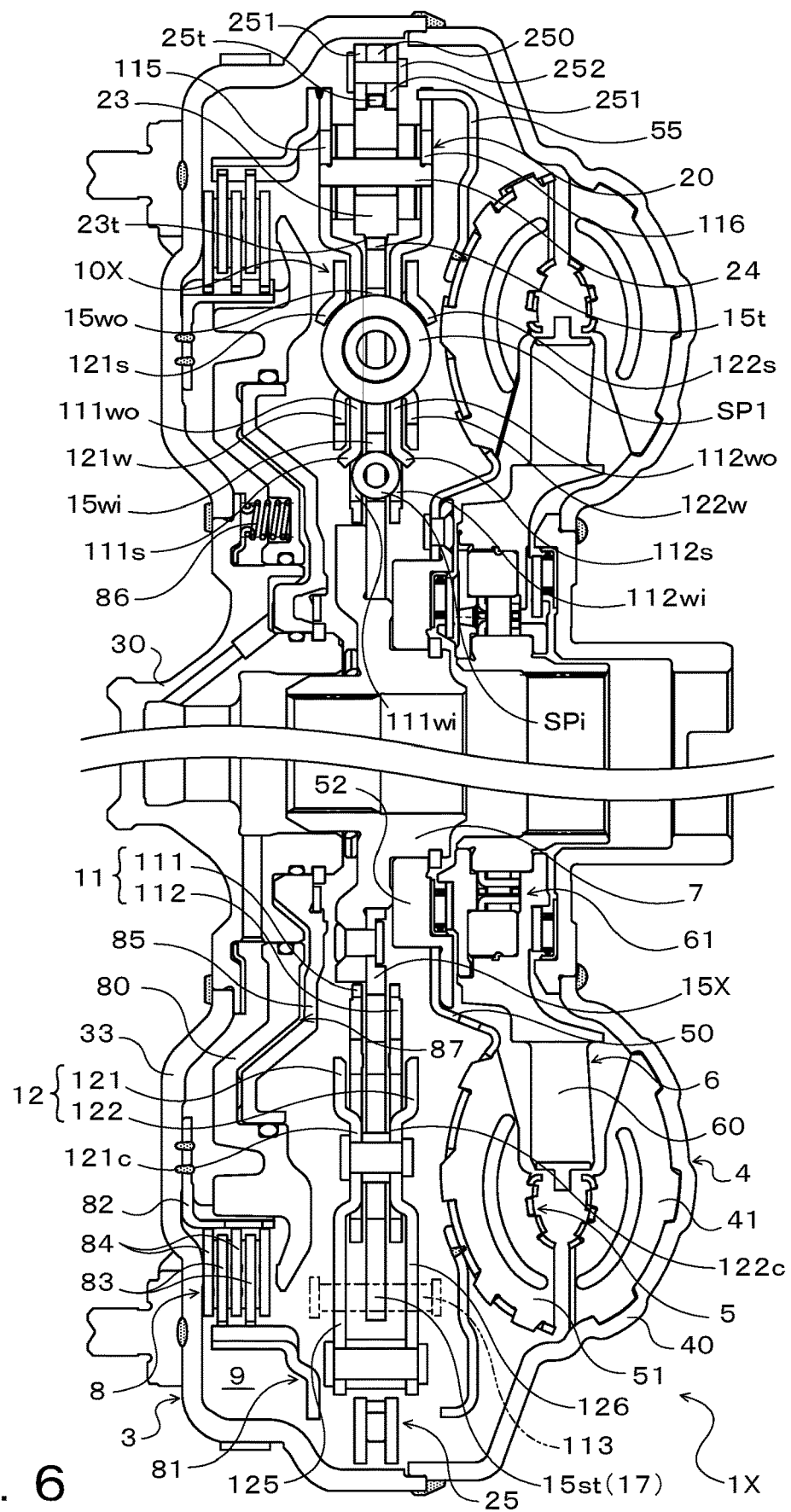
FIG. 6 is a sectional view illustrating a starting device including a damper device according to another embodiment of the disclosure.
Figure 7:
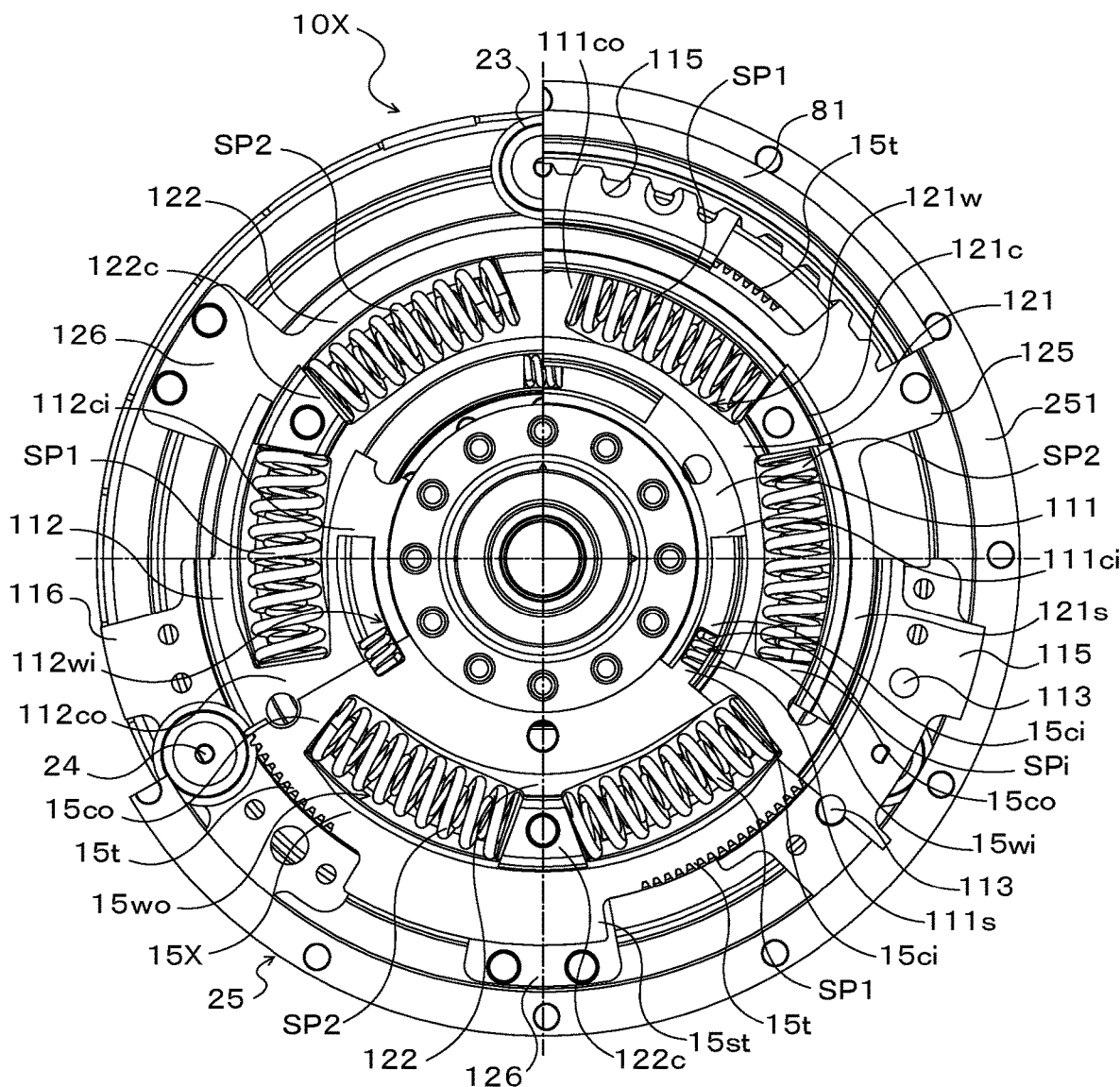
FIG. 7 is a front view illustrating the damper device of the starting device illustrated in FIG. 6.

Further, as in a damper device 10X of a starting device 1X shown in FIG. 6, the plurality of stopper contact portions 15st are respectively configured to extend in the radial direction of the damper device 10x from the outer circumferential portion of the driven member 15X so as to be capable of contacting with the rivet 113 (coupling member) by which the first and the second input plate members 111 and 112 are coupled. In the damper device 10X, as shown in FIG. 7, each of the stopper contact portions 15st is formed between the adjacent outer teeth gear portions 15t in the circumferential direction so as to radially protrude outside the outer teeth gear portions 15t from the outer circumferential portion of the driven member 15X. This enables the driven member 15X to be formed flat, thereby reducing machining costs of the driven member 15X.

In the damper device 10, 10X, the driven member 15, 15X or the sun gear, the plurality of pinion gears 23 and the ring gear 25 are arranged to at least partially overlap with the first and the second springs SP1 and SP2 (and the inner spring SPi) in the axial direction of the damper device 10, 10X as viewed in the radial direction (see FIGS. 2, 3 and 6). This configuration further shortens the axial length of the damper device 10, 10X and further increases the moment of inertia of the ring gear 25 by disposing the ring gear 25 in the outer circumference side of the damper device 10 while suppressing an increase of the weight of the ring gear 25 that works as the mass body of the rotary inertia mass damper 20, thereby enabling the inertia torque to be efficiently obtained.

Further, in the damper device 10, 10X, the rotation speed of the ring gear 25 or the mass body is increased by the action of the planetary gear 21 so as to be higher than the rotation speed of the drive member 11 (carrier). This reduces the weight of the ring gear 25 or the mass body while effectively ensuring the moment of inertia applied to the driven member 15, 15X from the rotary inertia mass damper 20. This also enhances the flexibility in design of the rotary inertia mass damper 20 and the entire damper device 10, 10X. The rotary inertia mass damper 20 (planetary gear 21) may, however, be configured to decrease the rotation speed of the ring gear 25 to be lower than the rotation speed of the drive member 11, according to the magnitude of the moment of inertia of the ring gear 25 (mass body). Further, the planetary gear 21 may be a double pinion-type planetary gear. Furthermore, the outer teeth gear portions 15t of the driven member 15, 15x, the gear tooth 23t of the pinion gear 23 and the inner tooth 25t of the ring gear 25 may be a helical tooth with a helical tooth trace or a tooth with a straight tooth trace.

As described above, the configuration that two antiresonance points A1 and A2 are set enables the antiresonance point A1 to be shifted toward the lower frequency. Depending on the specification of the vehicle, the motor and so on equipped with the damper device 10, 10X, the multiple root of Equation (5) ($=\frac{1}{2}\pi\cdot\sqrt{\{(k_1+k_2)/(2\cdot J_2)\}}$) may be set to the above minimum frequency $fa_1$. Determining the spring constants $k_1$ and $k_2$ of the first and the second springs SP1 and SP2 and the moment of inertia $J_2$ of the intermediate member 12 based on the multiple root of Equation (5) also improves the vibration damping effect of the damper device 10, 10X in the lower rotation speed range of the lockup area that is likely to increase the vibration from the engine EG as shown by the broken line curve in FIG. 5.

In the damper device 10, 10X described above, springs having the identical specification (spring constant) are employed for the first and the second springs SP1 and SP2. This is, however, not restrictive. The spring constants $k_1$ and $k_2$ of the first and the second springs SP1 and SP2 may be different from each other ($k_1 > k_2$ or $k_1 < k_2$). This further increases the value of the $\sqrt{}$ term (discriminant) in Equations (6) and (8) and further increases the interval between the two antiresonance points A1 and A2, thus further improving the vibration damping effect of the damper device in the low frequency range (low rotation speed range). In this case, the damper device 10, 10X may be provided with a stopper configured to restrict the deflection of one of the first and the second springs SP1 and SP2 (for example, one having the lower rigidity).

As described above, the ring gear 25 of the rotary inertia mass damper 20 includes two side plates 251 respectively fixed to the gear body 250 in such a manner that the inner circumferential surface of each side plate 251 is located slightly inside tips of the inner teeth 25$t$. However, each of the two side plates 251 may be fixed to the gear body 250 in such a manner that the inner circumferential surface of each side plate 251 is located radially inside bottoms of the inner teeth 25$t$ and radially outside the pinion shaft 24 supporting the pinion gear 23. Further, a diameter of the radially supporting portion 230$s$ of the pinion gear 23 (gear body 230) may also be reduced to be smaller than the above diameter. Namely, the inner circumferential surface of each side plate 251 of the ring gear 25 may be made close to the pinion shaft 24, so that the axial motion of the ring gear 25 is satisfactorily restricted by the pinion gears 23.

In order to restrict the axial motion of the ring gear 25 by the pinion gears 23, the pinion gear 23 may be provided with a pair of supporting portions that have an annular shape for example and protrude radially outside from both sides of the gear teeth 23$t$ and the side plates 251 may be omitted from the ring gear 25. In such a configuration, the supporting portions of the pinion gear 23 may be formed so as to oppose to at least the side face of the inner teeth 25$t$ of the ring gear 25 or a portion of the side face of the gear body 250.

As shown by two-dot chain lines in FIG. 1, the turbine runner 5 may be coupled with either the intermediate member 12 or the driven member 15. Further, the rotary inertia mass damper 20 may be configured to include the turbine runner 5 as the mass body that rotates in accordance with relative rotation between the drive member 11 and the driven member 15. In the damper device 10, 10X, the first and the second intermediate plate members 121 and 122 of the intermediate member 12 are arranged on both sides of the first and the second input plate members 111 and 112 in the axial direction and coupled with each other, but not limited to this. That is, the first and the second intermediate plate members 121 and 122 may be arranged on both sides of the driven member 15, 15X between the first and the second input plate members 111 and 112 in the axial direction and coupled with each other. Further, the intermediate member 12 may be omitted from the damper device 10, 10X and a plurality of springs that work in parallel to each other may be arranged between the drive member 11 and the driven member 15, 15X.

Figure 8:
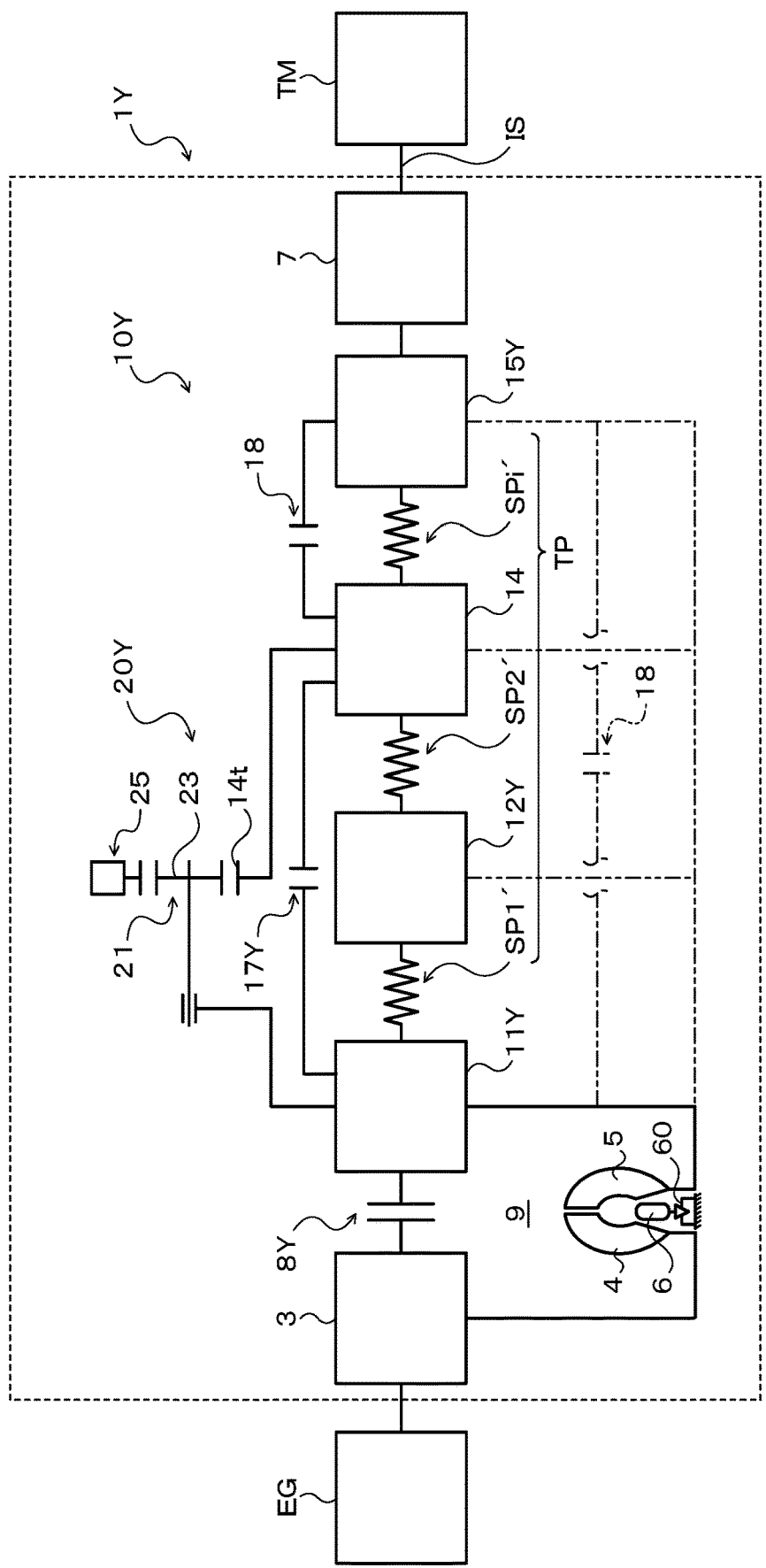
FIG. 8 is a schematic configuration diagram illustrating a starting device including a damper device according to yet another embodiment of the disclosure.
Figure 9:
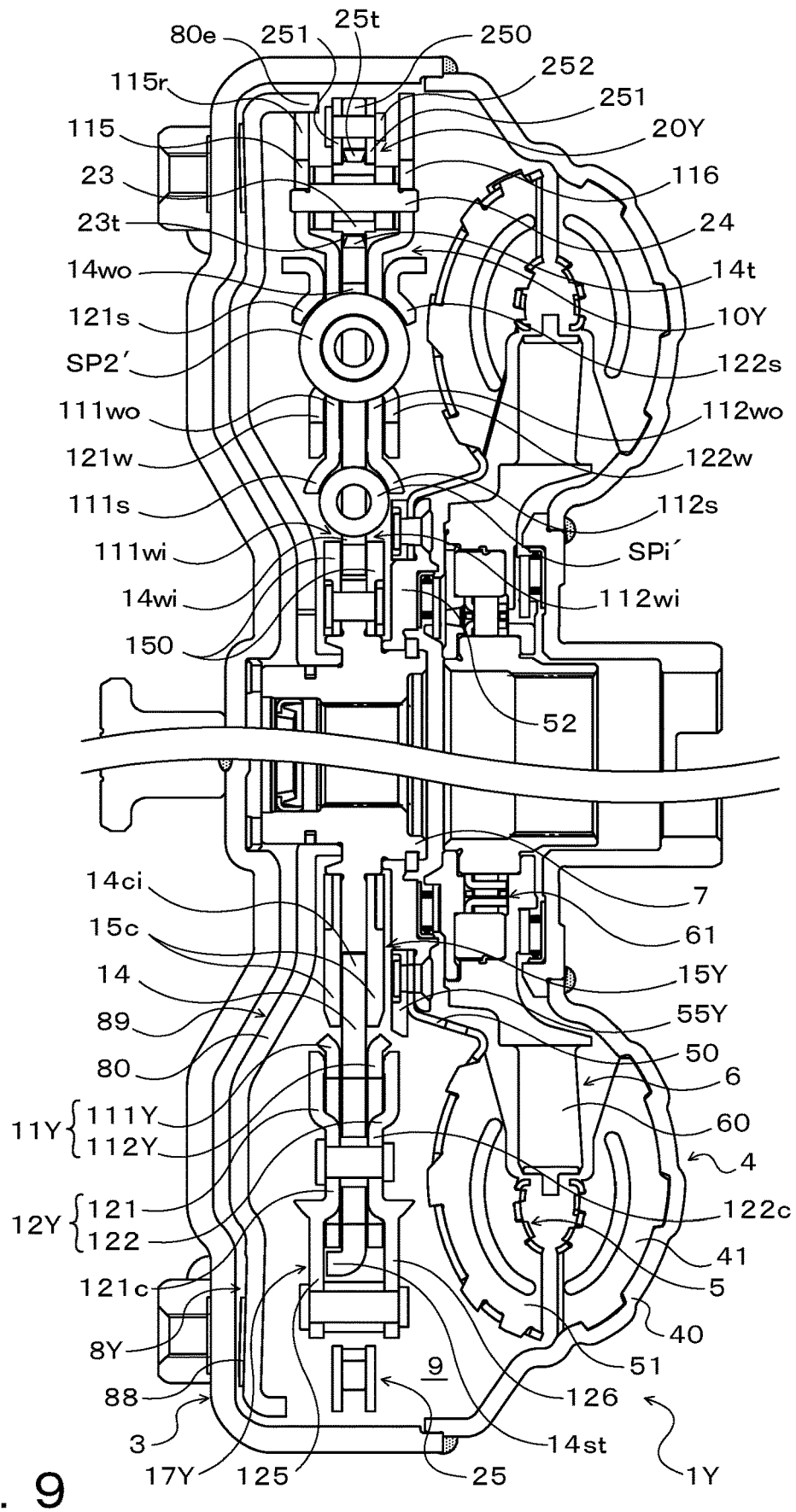
FIG. 9 is a sectional view illustrating the starting device illustrated in FIG. 8.

FIG. 8 is a schematic configuration diagram illustrating a starting device 1Y including a damper device 10Y according to another embodiment of the disclosure, and FIG. 9 is a sectional view illustrating the starting device 1Y. Among the components of the starting device 1Y and the damper device 10Y, the same components to those of the starting device 1 and the damper device 10 described above are expressed by the same reference signs and their repeated description is omitted.

The damper device 10Y shown in FIGS. 8 and 9 includes a lockup clutch 8Y configured as a single-disc hydraulic clutch. The lockup clutch 8Y includes a lockup piston 80 that is disposed inside of the front cover 3 so as to be close to an engine EG-side inner wall surface of the front cover 3. The lockup piston 80 is fitted into the damper hub 7 to be rotatable and movable in the axial direction. Friction members 88 are applied on an outer circumferential-side and front cover 3-side surface of the lockup piston 80. A lockup chamber 89 is defined between the lockup piston 80 and the front cover 3. The lockup chamber 89 is connected with a non-illustrated hydraulic control device via a hydraulic oil supply passage and an oil passage formed in the input shaft IS. In the starting device 1Y, the non-illustrated hydraulic control device sets the internal pressure of the fluid chamber 9 to be higher than the internal pressure of the lockup chamber 89 so as to engage the lockup clutch 8Y, thereby coupling the damper hub 7 with the front cover via the damper device 10. On the other hand, the non-illustrated hydraulic control device sets the internal pressure of the lockup chamber 89 to be higher than the internal pressure of the fluid chamber 9 so as to release the lockup clutch 8Y, thereby decoupling the damper hub 7 from the front cover 3. In the starting device 1Y, an inner circumferential portion of the turbine shell 50 is fixed to the turbine hub 52 by means of a plurality of rivets. The turbine hub 52 is rotatably supported by the damper hub 7. The motion of the turbine hub 52 (turbine runner 5) in the axial direction of the starting device 1Y is restricted by the damper hub 7 and a snap ring fitted to the damper hub 7.

The damper device 10Y of the staring device 1Y includes a drive member (input element) 11Y, a first intermediate member (first intermediate element) 12Y, a second intermediate member (second intermediate element) 14 and a driven member (output element) 15Y, as rotational elements. The damper device 10Y further includes a plurality of (for example, three in this embodiment) first springs (first elastic bodies) SP1' arranged to transmit the torque between the drive member 11Y and the first intermediate member 12Y, a plurality of (for example, three in this embodiment) second springs (second elastic bodies) SP2' arranged to transmit the torque between the first intermediate member 12Y and the second intermediate member 14, and a plurality of (for example, nine in this embodiment) inner springs (third elastic bodies) SPi' arranged to transmit the torque between the second intermediate member 14 and the driven member 15Y, as torque transmission elements (torque transmission elastic bodies).

The plurality of first springs SP1', the first intermediate member 12Y, the plurality of second springs SP2', the second intermediate member 14 and the plurality of inner springs SPi' configure a torque transmission path TP between the drive member 11Y and the driven member 15Y. This configuration of the damper device 10Y is substantially equivalent to the configuration that the plurality of inner springs SPi' working in parallel are disposed between the driven member 15Y and the input shaft IS of the transmission TM in the damper device 10 shown in FIG. 1. In the damper device 10Y, the inner springs SPi' are configured to have a larger spring constant (higher rigidity) than the spring constants (rigidities) of the first and the second springs SP1' and SP2'.

The drive member 11Y of the damper device 10Y is configured in the basically same structure as that of the drive member 11 of the damper device 10, 10X and works as the carrier of the planetary gear 21 of the rotary inertia mass damper 20Y. As shown in FIG. 9, the drive member 11Y is coupled with the lockup piston 80 of the lockup clutch 8Y. That is, a first input plate member 111Y of the drive member 11Y includes a plurality of engagement recesses 115r that are formed at intervals in the circumferential direction in the outer circumferential portion of the pinion gear supporting portions 115. A plurality of the engagement protrusions 80e are formed at intervals in the circumferential direction so as to extend from the lockup piston 80 in the axial direction. Each of the engagement protrusions 80e is fitted into any one of the plurality of engagement recesses 115r. Thus, the drive member 11Y is capable of rotating integrally with the lockup piston 80. The front cover 3 is coupled with the drive member 11Y of the damper device 10Y by engagement of the lockup clutch 8. When the lockup clutch 8Y is engaged, the plurality of engagement recesses 115r of the pinion gear supporting portions 115, which is a carrier, connects the plurality of the engagement protrusions 80e of the lockup piston 80 via a spline. When the lockup clutch 8Y is engaged, the lockup piston 80 is connected to the front cover 3. That is, the pinion gear supporting portions 115 are splined-engaged to the front cover 3 when the lockup clutch 8Y is engaged.

Figure 10:
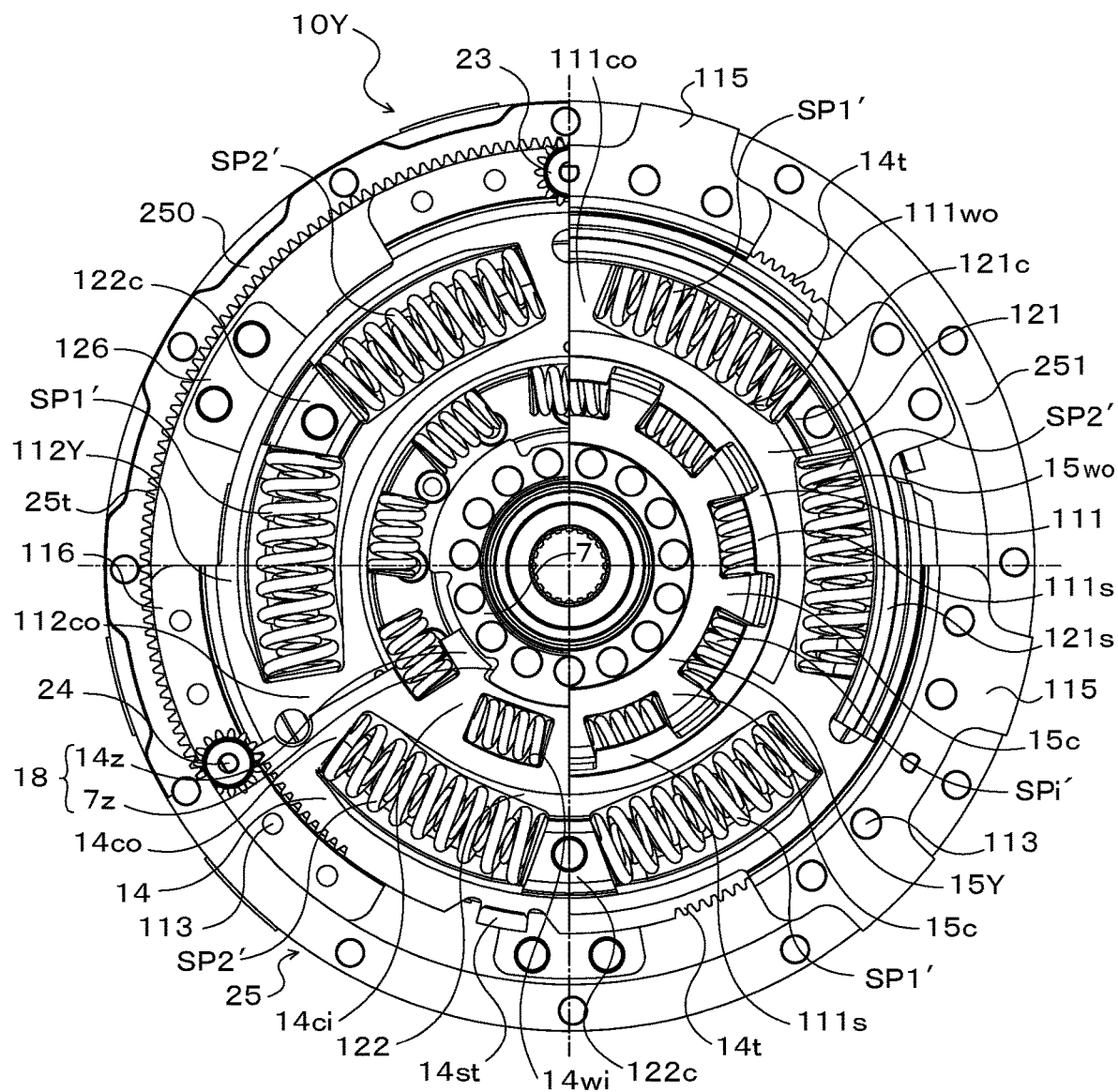
FIG. 10 is a front view illustrating the damper device of the starting device illustrated in FIGS. 8 and 9.

As shown in FIGS. 9 and 10, a plurality of (for example, nine in this embodiment) spring supporting portions 111s are formed at intervals (at equal intervals) in the circumferential direction in an inner circumferential portion of the first input plate member 111Y of the drive member 111. Each of the spring supporting portions 111s supports (guides) the corresponding inner spring SPi' on the front cover 3-side from the outer side in the radial direction. A plurality of (for example, nine in this embodiment) spring supporting portions 112s are formed at intervals (at equal intervals) in the circumferential direction in an inner circumferential portion of the second input plate member 112Y of the drive member 111. Each of the spring supporting portions 112s supports (guides) the corresponding inner spring SPi' on the turbine runner 5-side from the outer side in the radial direction. The inner spring-accommodating windows 111wi and 112wi in the damper device 10 and so on are omitted from the first and the second input plate member 111Y and 112Y.

Figure 11:
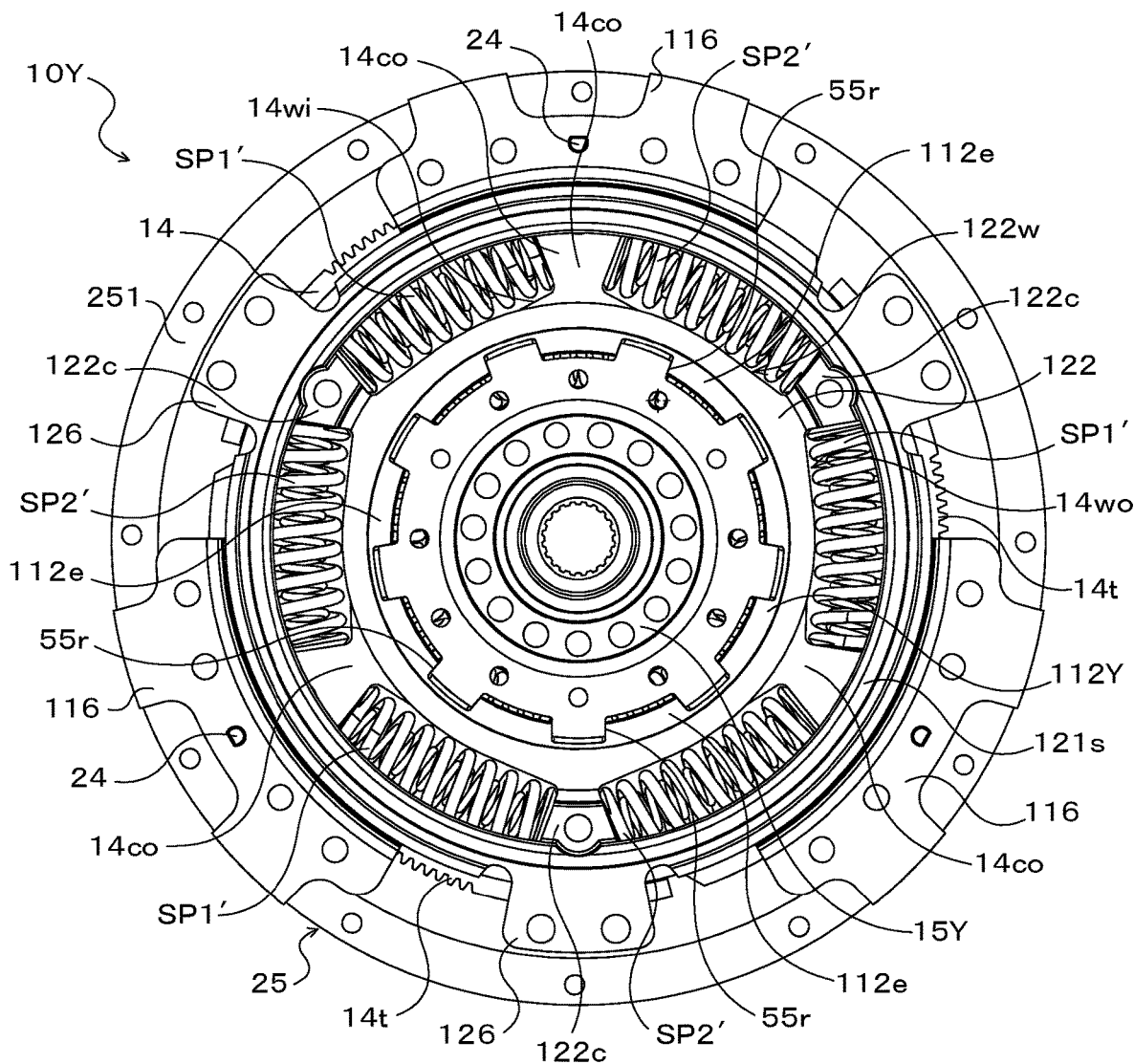
FIG. 11 is a front view illustrating the damper device of the starting device illustrated in FIGS. 8 and 9 seen from a turbine runner side.

On the side of the axial center of the damper device 10Y, the drive member 11Y is coupled with the turbine coupling member 55Y that is fixed to the turbine hub 52 by means of a plurality of rivets together with the turbine shell 50. As shown in FIG. 11, the second input plate member 112Y includes a plurality of (for example, nine in this embodiment) engagement protrusions 112e respectively protruding inwardly in the radial direction between the adjacent spring supporting portions 112s. Each of the engagement protrusions 112e is fitted into any one of the plurality of engagement recesses 55r that are formed at intervals in the circumferential direction in the outer circumferential portion of the turbine coupling member 55Y. Thus, the drive member 11Y and the turbine runner 5 are coupled with each other to be integrally rotated.

The first intermediate member 12Y of the damper device 10Y is configured in the basically same structure as that of the intermediate member 12 of the damper device 10, 10X. The damping ratio $\zeta$ of the first intermediate member 12Y is less than a value 1. On the other hand, the second intermediate member 14 is configured in the basically same structure as that of the driven member 15 of the damper device 10, 10X, but not fixed to the damper hub 7. The damping ratio $\zeta$ of the second intermediate member 14 is less than a value 1.

The second intermediate member 14 is a plate-like annular member that is disposed between the first and the second input plate members 111Y and 112Y in the axial direction and is rotatably supported (aligned) by the damper hub 7. A plurality of outer teeth gear portions 14t are formed at intervals (at equal intervals) in the circumferential direction in an outer circumference surface (outer circumference portion) of the second intermediate member 14 so as to be located radially outside the first springs SP1', the second springs SP2' and the inner springs SPi'. The second intermediate member 14 works as the sun gear of the planetary gear 21. The outer teeth gear portion 14t may be formed on the entire outer circumference portion of the second intermediate member 14.

As shown in FIGS. 9 and 10, the second intermediate member 14 is configured to include a plurality of (for example, three in this embodiment) arc-shaped outer spring-accommodating windows 14wo arranged at intervals (at equal intervals) in the circumferential direction, a plurality of (for example, nine in this embodiment) arc-shaped inner spring-accommodating windows 14wi arranged on an inner side in the radial direction of each outer spring-accommodating window 14wo at intervals (at equal intervals) in the circumferential direction, a plurality of (for example, three in this embodiment) outer spring contact portions 14co, and a plurality of (for example, nine in this embodiment) inner spring contact portions loci. One outer spring contact portion 14co is disposed between the outer spring-accommodating windows 14wo arranged adjacent to each other in the circumferential direction. The outer spring contact portion 14co comes into contact with the corresponding end of the second spring SP2'. One inner spring contact portion 14ci is disposed between the inner spring-accommodating windows 14wi arranged adjacent to each other in the circumferential direction. The inner spring-accommodating windows 14wi respectively have a circumferential length according to the natural length of the inner spring SPi'.

A plurality of (for example, three in this embodiment) stopper contact portions 14st are formed at intervals in the circumferential direction so as to be capable of contacting with a portion of the drive member 11Y in accordance with the relative rotation between the drive member 11Y and the second intermediate member 14. Each of the stopper contact portions 14st is extended in the axial direction from an outer circumferential portion of the second intermediate member 14 so as to be located between the adjacent outer teeth gear portions 14t in the circumferential direction and contact with the root portion of the axially extending portion 115a (see FIG. 4). In the damper device 10Y, each of the stopper contact portions 14st approaches the corresponding axially extending portion 115a of the first input plate member 111Y in accordance with the relative rotation between the drive member 11Y and the second intermediate member 14 and comes into contact with the portion of the first input plate member 111Y (the root portion of the axially extending portion 115a) when the input torque reaches the predetermined torque T1 and the torsion angle of the drive member 11Y relative to the second intermediate member 14 becomes equal to or larger than the predetermined angle θref. Thus, the stopper contact portions 14st and the first input plate member 111Y configure a stopper 17Y that restricts the relative rotation between the drive member 11Y and the second intermediate member 14 and the deflections of the first and the second springs SP1' and SP2'.

The driven member 15Y is configured to include two annular plates 150 respectively fixed to the damper hub 7 by means of a plurality of rivets so as to be spaced apart from each other in the axial direction of the damper device 10Y and and opposed to each other. Each of the annular plates 150 includes a plurality of (for example, nine in this embodiment) spring contact portions 15c respectively protruding outwardly in the radial direction at intervals in the circumferential direction from an inner circumferential portion that is fixed to the damper hub 7.

Each of the inner springs SPi' is disposed in the corresponding inner spring-accommodating window 14wi of the second intermediate member 14 and disposed between the adjacent spring contact portions 15c of the driven member 15Y. In the mounting state of the damper device 10Y, each of the inner spring contact portions 14ci of the second intermediate member 14 and each of the spring contact portions 15c of the driven member 15Y are respectively disposed between the adjacent inner springs SPi' in the circumferential direction and contact with ends of the adjacent inner springs SPi'. Each of the inner springs SPi' is supported (guided) from the outer side in the radial direction by the spring support portion 111s of the first input plate member 111Y on the front cover 3-side and the spring support portion 112s of the second input plate member 112 on the turbine runner 5-side.

As shown in FIGS. 9 and 10, each of the inner springs SPi' is arranged in the inner circumferential-side region in the fluid chamber 9 so as to be surrounded by the first and the second springs SP1' and SP2'. This configuration further shortens the axial length of both the damper device 10Y and the starting device 1 and reduces a centrifugal force applied to the inner springs SPi' so as to decrease a frictional force (sliding resistance) generated when each of the inner springs SPi' are pressed against the spring supporting portions 111s and 112s and the second intermediate member 14 by the centrifugal force.

An inner circumferential portion of the second intermediate member 14 is rotatably supported by the damper hub 7 between the two annular plates 150 in the axial direction. As shown in FIG. 10, a plurality of second stopper contact portions 14z are formed at intervals (equal intervals) in the circumferential direction so as to respectively protrude inwardly in the radial direction. Each of the second stopper contact portions 14z is loosely fitted into a corresponding one of a plurality of stopper recesses 7z that are formed at intervals in the circumferential direction in an outer circumference surface of the damper hub 7. Each of the stopper recesses 7z has a circumferential length longer than that of the each second stopper portion 14z. Each of the second stopper contact portions 14z comes into contact with a corresponding one of wall surfaces defining the stopper recess 7z in accordance with the relative rotation between the second intermediate member 14 and the driven member 15Y. That is, in the damper device 10Y, each of the second stopper contact portions 14z approaches the corresponding one of wall surfaces defining the stopper recess 7z in accordance with relative rotation between the second intermediate member 14 and the driven member 15Y (damper hub 7) and comes into contact with the corresponding one of wall surfaces defining the stopper recess 7z when the input torque or a torque applied from an axle side to the driven member 15Y (driven torque) reaches the above torque T2 corresponding to the maximum torsion angle θ max. Thus, the second stopper contact portions 14z and the stopper recesses 7z configure a second stopper 18 that restricts the relative rotation between the second intermediate member 14 and the driven member 15Y and the deflections of the inner springs SPi'.

When the lockup by the lockup clutch 8Y is released in the starting device 1Y with the above described damper device 10Y, as seen from FIG. 8, the torque (power) transmitted from the engine EG to the front cover 3 is transmitted to the input shaft IS of the transmission TM via a path including the pump impeller 4, the turbine runner 5, the drive member 11Y, the first springs SP1', the first intermediate member 12Y, the second springs SP2', the second intermediate member 14, the inner springs SPi', the driven member 15Y and the damper hub 7. On the other hand, when the lockup is executed by the lockup clutch 8Y of the starting device 1Y, on the other hand, the torque transmitted from the engine EG to the drive member 11 via the front cover 3 and the lockup clutch 8 is transmitted to the driven member 15 and the damper hub 7 via the torque transmission path TP including the plurality of first springs SP1', the first intermediate member 12Y, the plurality of second springs SP2', the second intermediate member 14 and the plurality of inner springs SPi', and the rotary inertia mass damper 20Y. At this time, the rotary inertia mass damper 20Y connected with the drive member 11 and the second intermediate member 14 mainly transmits the inertia torque to the driven member 15Y via the second intermediate member 14 and the inner springs SPi'.

When the input torque into the drive member 11 becomes equal to or higher than the above torque T1, the stopper 17Y restricts the relative rotation between the drive member 11Y and the second intermediate member 14 and the deflections of the first and the second springs SP1' and SP2'. Thus, until the input torque transmitted to the drive member 11 reaches the above torque T2, the torque (power) transmitted to the drive member 11Y is transmitted to the input shaft IS of the transmission TM via a path including the drive member 11Y, the first springs SP1', the first intermediate member 12Y, the second springs SP2', the second intermediate member 14, and components of the rotary inertia mass damper 20Y, that rotate integrally, the plurality of inner springs SPi', the driven member 15Y and the damper hub 7. Accordingly, the damper device 10Y has two-step (two-stage) damping characteristics. When the input torque into the drive member 11 becomes equal to or higher than the above torque T2, the second stopper 18 restricts the relative rotation between the second intermediate member 14 and the driven member 15Y and the deflections of the inner springs SPi. Thus, all of the elements from drive member 11 to the damper hub 7 rotate integrally.

Further, in the damper device 10Y, the rotary inertia mass damper 20Y is provided in parallel to the first and the second springs SP1' and SP2' and the first intermediate member 12Y. Accordingly, in the damper device 10Y, two (multiple) natural frequencies may be set for the torque transmission path from the drive member 11Y to the second intermediate member 14 in the state that the deflections of at least the first and the second springs SP1' and SP2' are allowed, and a resonance of the first intermediate member 12Y (second resonance) may occur at the higher rotation speed (the higher frequency) than a first resonance. This enables a total of two antiresonance points that provide theoretically zero vibration amplitude of the driven member 15Y to be set in the damper device 10Y.

The damper device 10Y is especially suitable to be used in combination with a transmission TM for rear-wheel drive. In the transmission TM for rear-wheel drive having a long length from one end of an input shaft IS (starting device 1Y-side end) to one end of a non-illustrated output shaft (wheel side-end), the rigidities of the input shaft IS coupled with the driven member 15Y of the damper device 10Y and of the output shaft (and additionally an intermediate shaft) are decreased. Accordingly a natural frequency (resonance frequency) determined by the moments of inertia of these shaft members is decreased (lowered) by the effect of the moment of inertia of the entire rotary inertia mass damper 20Y. This may obviously cause a resonance, which is supposed to occur at the high rotation speed of the drive member 11Y (engine EG), even in a low rotation speed range. The configuration that the rotary inertia mass damper 20Y is connected with the drive member 11Y and the second intermediate member 14 of the damper device 10Y, on the other hand, causes the inner springs SPi' to be placed between the rotary inertia mass damper 20Y and the input shaft IS of the transmission TM connected with the driven member 15Y, thereby substantially separating the rotary inertia mass damper 20Y from the input shaft IS. This configuration enables two antiresonance points to be set and remarkably effectively reduces the effect of the moment of inertia of the entire rotary inertia mass damper 20Y on a natural frequency determined by the moment of inertia of the shaft member connected with the driven member 15Y and so on.

The damper device 10Y may, however, be used in combination with a transmission TM for front-wheel device. In the case where the damper device 10Y is combined with the transmission TM for front-wheel vehicle, the configuration of the damper device 10Y also remarkably effectively reduces the effect of the moment of inertia of the entire rotary inertia mass damper 20Y on the natural frequency determined by the moment of inertia of the shaft member coupled with the driven member 15Y and so on, and additionally improves the vibration damping performance of the damper device 10Y by a further decrease of the rigidity. The damper device 10Y may be configured such as to include any additional intermediate member and springs (elastic bodies) between the first intermediate member 12Y and the second intermediate member 14. Furthermore, the turbine runner 5 may be coupled with one of the first and the second intermediate members 12Y and 14 as shown by a two-dot chain line in FIG. 8 or may be coupled with the driven member 15Y.

Further, the rotary inertia mass damper 20Y may be configured to include the turbine runner 5 as the mass body that rotates in accordance with relative rotation between the drive member 11Y and the second intermediate member 14 (driven member 15Y). The stopper contact portions 14st may be extended in the axial direction from the outer circumferential portion of the second intermediate member 14 so as to be capable of contacting with the second input plate member 112 (for example, axially extending portion 116a). The plurality of stopper contact portions 14st may be respectively extended in the radial direction from the outer circumferential portion of the second intermediate member 14 so as to be capable of respectively contacting with a rivet (coupling member) that couples the first input plate member 111Y with the second input plate member 112Y. As shown by two-dot chain lines in FIG. 8, the second stopper 18 may restrict the relative rotation between the drive member 11Y and the driven member 15Y. In the damper device 10Y, the first and the second intermediate plate members 121 and 122 of the intermediate member 12Y are arranged on both sides of the first and the second input plate members 111Y and 112Y in the axial direction and coupled with each other, but not limited to this. That is, the first and the second intermediate plate members 121 and 122 of the intermediate member 12Y may be arranged on both sides of the second intermediate member 14 between the first and the second input plate members 111Y and 112Y in the axial direction and coupled with each other. Further, the intermediate member 12Y may be omitted from the damper device 10Y and a plurality of springs that work in parallel to each other may be arranged between the drive member 11Y and the second intermediate member 14.

Figure 12:
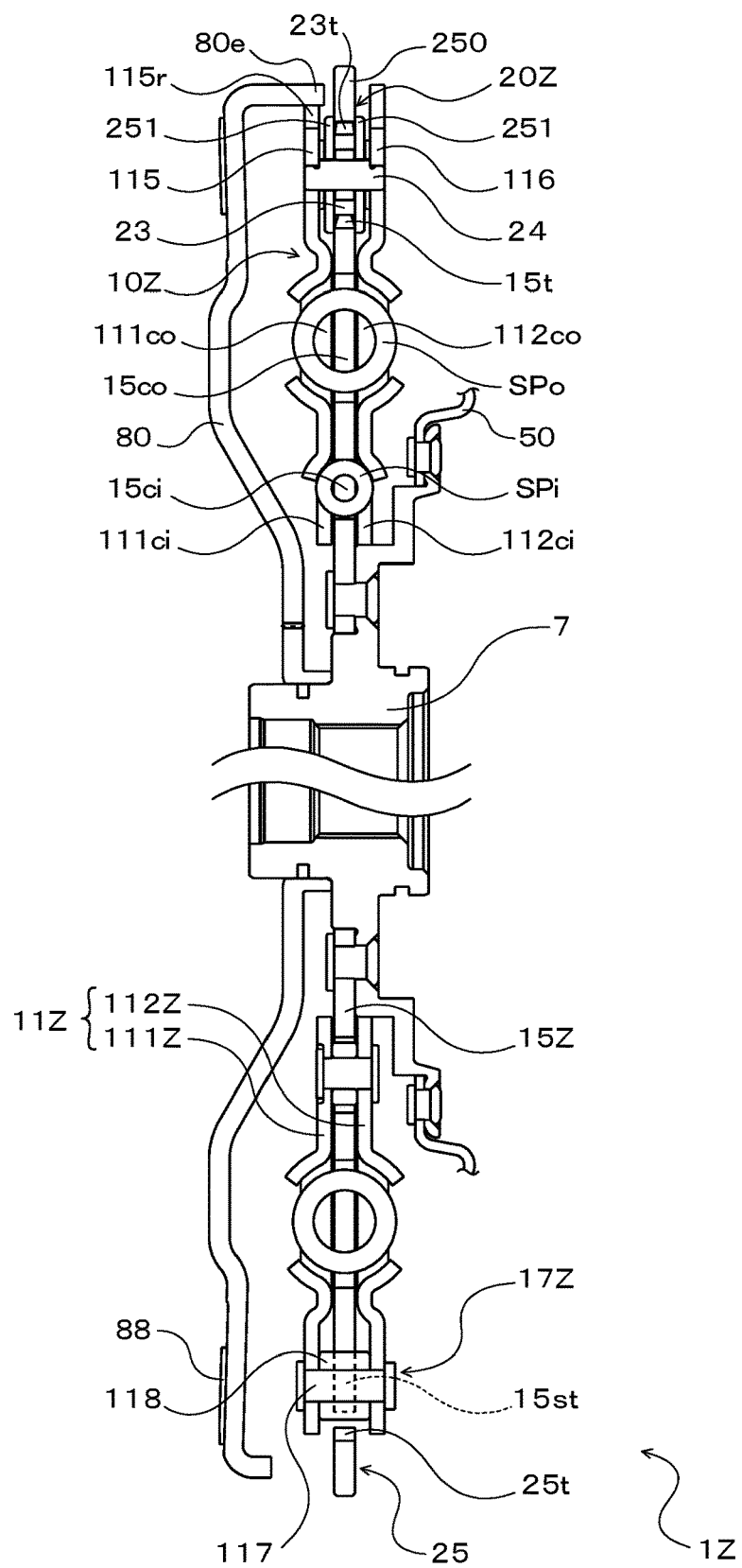
FIG. 12 is a sectional view illustrating a starting device including a damper device according to another embodiment of the disclosure.

FIG. 12 is a sectional view illustrating a starting device 1Z including a damper device 10Z according to another embodiment of the disclosure. Among the components of the starting device 1Z and the damper device 10Z, the same components to those of the starting device 1, 1Y and so on and the damper device 10, 10Y and so on described above are expressed by the same reference signs and their repeated description is omitted.

The damper device 10Z of the staring device 1Z shown in FIG. 12 includes a drive member 11Z to which the torque from the engine EG is transmitted, a driven member 15Z, a plurality of outer springs SPo and a plurality of inner springs SPi respectively arranged to transmit the torque between the drive member 11Z and the driven member 15Z, and a rotary inertia mass damper 20Z with the ring gear 25 or the mass body that rotates in accordance with a relative rotation between the drive member 11Z and the driven member 15Z. In the damper device 10Z, the inner springs SPi are arranged to work in parallel to the outer springs SPo after the input torque into the drive member 11Z reaches the predetermined torque (first threshold value) T1 and the torsion angle of the drive member 11Z relative to the driven member 15Z becomes equal to or larger than the predetermined angle. The damper device 10 accordingly has two-step (two-stage) damping characteristics.

The drive member 11Z includes an annular first and second input plate members (first and second rotational support members) 111Z and 112Z that are coupled with each other by means of a plurality of rivets 117 so as to be opposed to each other in the axial direction of the damper device 10Z and rotatably support the plurality of the pinion gears 23 of the planetary gear 21. The first input plate member 111Z is configured to include a plurality of outer spring contact portions 111co that respectively contact with a corresponding end of the outer spring SPo and a plurality of inner spring contact portions 111ci that respectively contact with a corresponding end of the inner spring SPi. The first input plate member 111Z includes a plurality of engagement recesses 115r that are formed at intervals in the circumferential direction in the outer circumferential portion of the pinion gear supporting portions 115. The plurality of the engagement protrusions 80e are formed at intervals in the circumferential direction so as to extend from the lockup piston 80 in the axial direction. Each of the engagement protrusions 80e is fitted into any one of the plurality of engagement recesses 115r. The second input plate member 112Z is configured to include a plurality of outer spring contact portions 112co that respectively contact with the corresponding end of the outer spring SPo and a plurality of inner spring contact portions 112*ci* that respectively contact with the corresponding end of the inner spring SPi and is rotatably supported by the damper hub 7.

The driven member 15Z is fixed to the damper hub 7 by means of a plurality of rivets and disposed between the first and the second input plate members 111Z and 112Z in the axial direction. As shown in FIG. 12, the driven member 15Z is configured to include a plurality of outer spring contact portions 15*co* that respectively contact with the corresponding end of the outer spring SPo and a plurality of inner spring contact portions 15*ci* that respectively contact with the corresponding end of the inner spring SPi. Further, the driven member 15Z includes a plurality of outer teeth gear portions 15*t* formed at intervals in the circumferential direction in the outer circumferential portion thereof so as to respectively mesh with the corresponding pinion gear 23 of the rotary inertia mass damper 20Z and works as the sun gear of the rotary inertia mass damper 20Z.

The damper device 10Z further includes a stopper 17Z configured to restrict a relative rotation between the drive member 11Z and the driven member 15Z. In the embodiment of FIG. 12, the stopper 17Z includes a plurality of stopper contact portions 15*st* formed in the outer circumferential portion of the driven member 15Z so as to be located between the adjacent outer teeth gear portions 15*t* in the circumferential direction. Each of the stopper contact portions 15*st* comes into contact with a collar 118 fitted to the rivet 117 that couples the first input plate member 111Z with the second input plate member 112Z in accordance with the relative rotation between the drive member 11Z and the driven member 15Z.

Thus, in the damper device 10Z, the relative rotation between the drive member 11Z and the driven member 15Z is restricted so as to prevent the excessive load including the inertia torque from the rotary inertia mass damper 20Z from acting on the outer and the inner springs SPo and SPi when the larger torque is transmitted between the drive member 11Z and the driven member 15Z, thereby satisfactorily protecting the outer and the inner springs SPo and SPi. Further, the stopper contact portions 15*st* are arranged in the outer circumferential portion of the driven member 15Z (sun gear) so as to make a distance from the axial center of the damper device 10Z to the stopper contact portion 15*st* closer to a distance from the axial center of the damper device 10Z to the pinion gear supporting portions 115 and 116 in the drive member 11Z. This decreases moment acting on the drive member 11Z (first and second input plate members 111Z and 112Z) that supports the plurality of pinion gears 23 and prevents deformation and so on of the drive member 11Z when the stopper contact portions 15*st* contacts with the drive member 11Z so as to restrict the relative rotation between the drive member 11Z and the driven member 15Z. Accordingly, the durability of the damper device 10Z with the rotary inertia mass damper 20Z can be improved.

Figure 13:
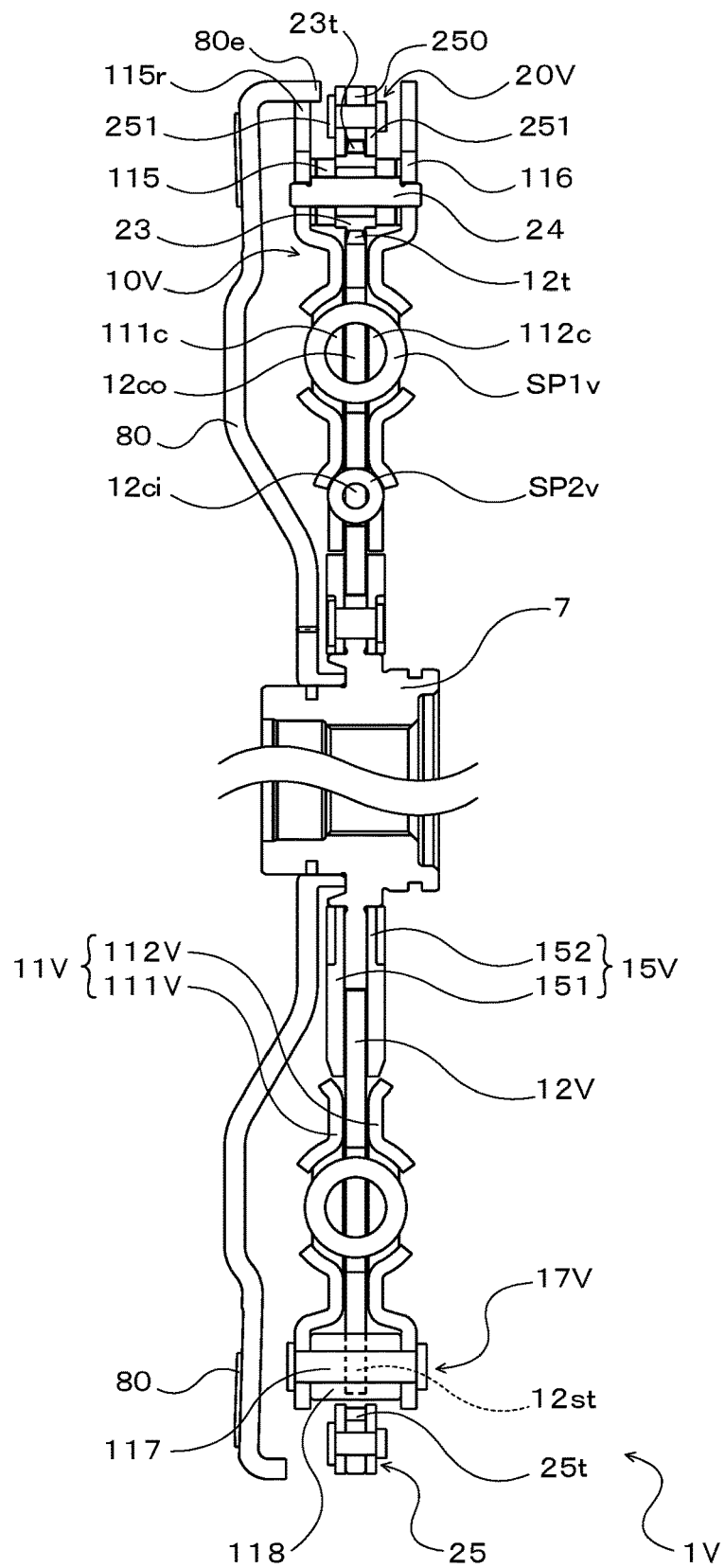
FIG. 13 is a sectional view illustrating a starting device including a damper device according to yet another embodiment of the disclosure.

FIG. 13 is a schematic configuration diagram illustrating a starting device 1V including a damper device 10V according to another embodiment of the disclosure. Among the components of the starting device 1V and the damper device 10V, the same components to those of the starting device 1, 1Y and so on and the damper device 10, 10Y and so on described above are expressed by the same reference signs and their repeated description is omitted.

The damper device 10V of the staring device 1V shown in FIG. 13 includes a drive member 11V to which the torque from the engine EG is transmitted, an intermediate member 12V, a driven member 15V, a plurality of first springs SP1*v* arranged to transmit the toque between the drive member 11V and the intermediate member 12V, a plurality of second springs SP2*v* arranged to transmit the torque between the intermediate member 12V and the driven member 15V, and a rotary inertia mass damper 20V with the ring gear 25 or the mass body that rotates in accordance with a relative rotation between the drive member 11V and the intermediate member 12V.

The drive member 11V includes an annular first and second input plate members (first and second rotational support members) 111V and 112V that are coupled with each other by means of the plurality of rivets 117 so as to be opposed to each other in the axial direction of the damper device 10V and rotatably support the plurality of the pinion gears 23 of the planetary gear 21. The first input plate member 111V is configured to include a plurality of spring contact portions 111*c* that respectively contact with a corresponding end of the first spring SP1*v* and a plurality of engagement recesses 115*r* into which the corresponding engagement protrusion 80*e* of the lockup piston 80 is fitted. The second input plate member 112V is configured to include a plurality of spring contact portions 112*c* that respectively contact with the corresponding end of the first spring SP1*v*.

The intermediate member 12V is disposed between the first and the second input plate members 111V and 112V in the axial direction. As shown in FIG. 13, the intermediate member 12V is configured to include a plurality of outer spring contact portions 12*co* that respectively contact with the corresponding end of the first spring SP1*v* and a plurality of inner spring contact portions 12*ci* that respectively contact with the corresponding end of the second spring SP2*v*. Further, the intermediate member 12V includes a plurality of outer teeth gear portions 12*t* arranged at intervals in the circumferential direction in the outer circumferential portion thereof so as to respectively mesh with the corresponding pinion gear 23 of the rotary inertia mass damper 20V and works as the sun gear of the rotary inertia mass damper 20V. The driven member 15V includes the first and the second driven plate members 151 and 152 arranged on both sides of the intermediate member 12V in the axial direction and fixed to the damper hub 7. The first and the second driven member 151 and 152 respectively include a plurality of spring contact portions (not shown) that respectively contact with the corresponding end of the second spring SP2*v*.

The damper device 10V further includes a stopper 17V configured to restrict a relative rotation between the drive member 11V and the intermediate member 12V. In the embodiment of FIG. 13, the stopper 17V includes a plurality of stopper contact portions 12*st* formed in the outer circumferential portion of the intermediate member 12V so as to be located between the adjacent outer teeth gear portions 12*t* in the circumferential direction. Each of the stopper contact portions 12*st* comes into contact with the collar 118 fitted to the rivet 117 that couples the first input plate member 111V with the second input plate member 112V in accordance with the relative rotation between the drive member 11V and the intermediate member 12V.

Thus, in the damper device 10V, the relative rotation between the drive member 11V and the intermediate member 12V is restricted so as to prevent the excessive load including the inertia torque from the rotary inertia mass damper 20V from acting on the outer and the first springs SP1*v* when the larger torque is transmitted between the drive member 11V and the intermediate member 12V, thereby satisfactorily protecting the first springs SP1*v*. Further, the stopper contact portions 12*st* are arranged in the outer circumferential portion of the intermediate member 12V (sun gear) so as to make a distance from the axial center of the damper device 10V to the stopper contact portion 12st closer to a distance from the axial center of the damper device 10V to the pinion gear supporting portions 115 and 116 in the drive member 11V. This decreases moment acting on the drive member 11V (first and second input plate members 111V and 112V) that supports the plurality of pinion gears 23 and prevents deformation and so on of the drive member 11V when the stopper contact portions 12st contacts with the drive member 11V so as to restrict the relative rotation between the drive member 11V and the intermediate member 12V. Accordingly, the durability of the damper device 10V with the rotary inertia mass damper 20V can be improved.

As has been described above, a damper device (10, 10X, 10Y) according to one aspect of the disclosure is configured to include a first, a second, and a third rotational element (11, 11Y, 12, 12Y, 15, 15X, 14), a first elastic body (SP1, SP1') arranged to transmit a torque between the first element and the second element (11, 11Y, 12, 12Y), a second elastic body (SP2, SP2') arranged to transmit a torque between the second element and the third element (12, 12Y, 15, 15X, 14), and a rotary inertia mass damper (20, 20Y) with a mass body (25) rotating in accordance with relative rotation between the first rotational element and the third rotational element (11, 11Y, 15, 15X, 14). The damper device includes a stopper (17, 17Y) configured to restrict the relative rotation between the first rotational element and the third rotational element (11, 11Y, 15, 15X, 14). The rotary inertia mass damper (20, 20Y) is configured to include a planetary gear (21) that includes a sun gear (15, 15X, 15t, 14, 14t), a plurality of pinion gears (23) that mesh with the sun gear (15, 15X, 15t, 14, 14t), and a ring gear (25) that works as the mass body. The first rotational element (11, 11Y) is configured to include a first rotational support member and a second rotational support member (111, 112, 111Y, 112Y) that are coupled with each other so as to be opposed to each other in an axial direction of the damper device (10, 10X, 10Y). The first and the second rotational support members (111, 112, 111Y, 112Y) rotatably support the plurality of pinion gears (23). The third rotational element (15, 15X, 14) is configured to include an outer teeth gear portion (15t, 14t) that meshes with the plurality of pinion gears (23) in an outer circumferential portion thereof. The third rotational element (15, 15X, 14) is disposed between the first and the second rotational support members (111, 112, 111Y, 112Y) in the axial direction so as to work as the sun gear. The stopper (17, 17Y) is configured to include a contact portion (15st, 14st) arranged in the outer circumferential portion of the third rotational element (15, 15X, 14) so as to contact with a portion of the first rotational element (11, 11Y) in accordance with the relative rotation between the first rotational element and the third rotational element (11, 11Y, 15, 15X, 14).

The first rotational element of the damper device includes the first and the second rotational support member that are coupled with each other so as to be opposed to each other in the axial direction of the damper device and rotatably support the plurality of pinion gears. The third rotational element includes the outer teeth gear portion that meshes with the plurality of pinion gears in the outer circumferential portion thereof and is disposed between the first and the second rotational support members in the axial direction so as to work as the sun gear. The damper device includes the stopper configured to restrict the relative rotation between the first rotational element and the third rotational element. The stopper includes the contact portion arranged in the outer circumferential portion of the third rotational element so as to contact with the portion of the first rotational element in accordance with the relative rotation between the first rotational element and the third rotational element.

Thus, the relative rotation between the first rotational element and the third rotational element is restricted so as to prevent an excessive load including the inertia torque from the rotary inertia mass damper from acting on the first and the second springs when a larger torque is transmitted between the first and the third rotational elements, thereby satisfactorily protecting the first and the second springs. Further, the contact portion of the stopper is arranged in the outer circumferential portion of the third rotational element (sun gear) so as to make a distance from the axial center of the damper device to the contact portion closer to a distance from the axial center of the damper device to a support portion of the pinion gears in the first rotational element. This decreases moment acting on the first rotational element (the first and the second rotational support members) that supports the plurality of pinion gears and prevents deformation and so on of the first rotational element when the contact portion contacts with the first rotational element so as to restrict the relative rotation between the first rotational element and the third rotational element. Accordingly, the durability of the damper device with the rotary inertia mass damper can be improved.

The third rotational element (15, 15x, 14) may be configured to include a plurality of outer teeth gear portions (15t, 14t). The plurality of outer teeth gear portions (15t, 14t) may be arranged at intervals in a circumferential direction in the outer circumferential portion. A plurality of contact portions (15st, 14st) may be arranged in the outer circumferential portion so as to be located between the adjacent outer teeth gear portions (15t, 14t) in the circumferential direction. That is, in the sun gear of the planetary gear included in the rotary inertia mass damper, the outer teeth gear portions may be formed in a range corresponding to a moving range of each pinion gear and is not necessarily required to be formed in the entire outer circumferential portion of the sun gear (the third rotational element). Accordingly, when the plurality of outer teeth gear portions are arranged at intervals in the circumferential direction in the outer circumferential portion of the third rotational element, the contact portion of the stopper may be located between the adjacent outer teeth gear portions in the circumferential direction so as to suppress overall size expansion and complication of a structure of the first element, the third rotational element and the damper device even if the contact portion (the stopper) is arranged in the third rotational element.

The contact portion (15st, 14st) may be configured to extend in the axial direction from the outer circumferential portion of the third rotational element (15, 15X, 14) so as to be capable of contacting with one of the first and the second rotational support members (111, 112). This satisfactorily suppresses overall size expansion and complication of the structure of the first element, the third rotational element and the damper device even if the contact portion (the stopper) is arranged in the third rotational element.

The contact portion (15st) may be configured to extend in a radial direction of the damper device (10x) from the outer circumferential portion of the third rotational element (15X) so as to be capable of contacting with a coupling member (113) by which the first and the second rotational support members (111, 112) are coupled. This enables the third rotational element to be formed flat, thereby reducing machining costs of the third rotational element.

The damper device (10, 10X) may further include an input element (11), an intermediate element (12), and an output element (15, 15X). The first rotational element may be the input element (11), the second rotational element may be the intermediate element (12), and the third element may be the output element (15, 15X). This enables two antiresonance points, where the vibration transmitted from the input element to the output element via the first and the second springs and the vibration transmitted from the input element to the output element via the rotary inertia mass damper are theoretically cancelled out each other, to be set in the damper device. Thus, the damper device of this aspect remarkably effectively improves the vibration damping performance of the damper device by making the frequencies of the two antiresonance points equal to (closer to) the frequency of the vibrations (resonances) to be damped by the damper device.

The damper device (10, 10X) may further include a third elastic body (SPi) arranged to work in parallel to the first and the second elastic bodies (SP1, SP2) and to transmit a torque between the input element (11) and the output element (15, 15X). This enables the damper device to have two-step (two-stage) damping characteristics.

The damper device (10Y) may further include an input element (11Y), a first intermediate element (12Y), a second intermediate element (14), an output element (15), and a third elastic body (SPi') arranged to transmit a torque between the second intermediate element (14) and the output element (15). The first rotational element may be the input element (11Y), the second rotational element may be the first intermediate element (12Y), and the third element may be the second intermediate element (14). In the damper device, two antiresonance points can be set so as to remarkably effectively improve the vibration damping performance of the damper device by making the frequencies of the two antiresonance points equal to (closer to) the frequency of the vibrations (resonances) to be damped by the damper device. Further, in the damper device of this aspect, the rotary inertia mass damper is connected with the input element and the second intermediate element of the damper device. This causes the third elastic body to be placed between the rotary inertia mass damper and a member coupled with the output element, thereby substantially separating the rotary inertia mass damper from the member. This enables two antiresonance points to be set and remarkably effectively reduces the effect of the moment of inertia of the entire rotary inertia mass damper on a natural frequency determined by the moment of inertia of the member coupled with the output element. Even when the member coupled with the output element of the damper device has a low rigidity and the natural frequency (resonance frequency) determined by the moment of inertia of the member is decreased by the effect of the moment of inertia of the entire rotary inertia mass damper, this results in effectively suppressing a resonance which is supposed to occur at the high rotation speed of the input element from being obviously caused even in a low rotation range.

The damper device (10, 10X, 10Y) may be configured not to restrict deflections of the first and the second elastic bodies (SP1, SP2) until an input torque transmitted to the input element (11, 11Y) becomes equal to or larger than a predetermined threshold value (T2, T1).

The torque from the engine (EG) may be transmitted to the input element (11, 11Y) via a clutch (8, 8Y), and the output element (15, 15X, 15Y) may be connected with an input shaft (IS) of a transmission (TM).

A damper device (10Z) according to another aspect of the disclosure is configured to include an input element (11Z) to which a torque from an engine (EG) is transmitted, an output element (15Z), an elastic body (SPo, SPi) arranged to transmit a torque between the input element (11Z) and the output element (15Z), and a rotary inertia mass damper (20Z) with a mass body (25) rotating in accordance with relative rotation between the input element (11Z) and the output element (15Z). The damper device (10Z) includes a stopper (17Z) configured to restrict the relative rotation between the input element (11Z) and the output element (15Z). The rotary inertia mass damper (20Z) is configured to include a planetary gear (21) that includes a sun gear (15Z, 15t), a plurality of pinion gears (23) that mesh with the sun gear (15Z, 15t), and a ring gear (25) that works as the mass body. The input element (11Z) is configured to include a first rotational support member and a second rotational support member (111Z, 112Z) that are coupled with each other so as to be opposed to each other in an axial direction of the damper device (10Z). The first and the second rotational support members (111Z, 112Z) rotatably support the plurality of pinion gears (23). The output element (15Z) is configured to include a plurality of outer teeth gear portions (15t) arranged at intervals in a circumferential direction in the outer circumferential portion thereof so as to mesh with any of the plurality of pinion gears (23). The output element (15Z) is disposed between the first and the second rotational support members (111Z, 112Z) in the axial direction so as to work as the sun gear. The stopper (17Z) is configured to include a contact portion (15st) arranged in the outer circumferential portion of the output element (15Z) so as to be located between the adjacent outer teeth gear portions (15t) in the circumferential direction and to contact with a portion (118) of the input element (11Z) in accordance with the relative rotation between the input element (11Z) and the output element (15Z).

The damper device is capable of restricting the relative rotation between the input element and the output element so as to prevent an excessive load including the inertia torque from the rotary inertia mass damper from acting on the elastic body when a larger torque is transmitted between the input element and the output element, thereby satisfactorily protecting the elastic body. Further, the contact portion of the stopper is arranged in the outer circumferential portion of the output element (sun gear) so as to make a distance from the axial center of the damper device to the contact portion closer to a distance from the axial center of the damper device to a support portion of the pinion gears in the input element. This decreases moment acting on the input element (the first and the second rotational support members) that supports the plurality of pinion gears and prevents deformation and so on of the input element when the contact portion contacts with the input element so as to restrict the relative rotation between the input element and the output element. Accordingly, the durability of the damper device with the rotary inertia mass damper can be improved.

A damper device (10V) according to yet another aspect of the disclosure is configured to include an input element (11V) to which a torque from an engine (EG) is transmitted, an intermediate element (12V), an output element (15V), a first elastic body (SP1v) arranged to transmit a torque between the input element (11V) and the intermediate element (12V), a second elastic body (SP2v) arranged to transmit a torque between the intermediate element (12V) and the output element (15V), and a rotary inertia mass damper (20V) with a mass body (25) rotating in accordance with relative rotation between the input element (11V) and the intermediate element (12V). The damper device (10V) includes a stopper (17V) configured to restrict the relative rotation between the input element (11V) and the intermediate element (12V). The rotary inertia mass damper (20V) is configured to include a planetary gear (21) that includes a sun gear (12V, 12t), a plurality of pinion gears (23) that mesh with the sun gear (12V, 12t), and a ring gear (25) that works as the mass body. The input element (11V) is configured to include a first rotational support member and a second rotational support member (111V, 112V) that are coupled with each other so as to be opposed to each other in an axial direction of the damper device (10V). The first and the second rotational support members (111V, 112V) rotatably support the plurality of pinion gears (23). The intermediate element (12V) is configured to include a plurality of outer teeth gear portions (12t) arranged at intervals in a circumferential direction in the outer circumferential portion thereof so as to mesh with any of the plurality of pinion gears (23). The intermediate element (12V) is disposed between the first and the second rotational support members (111V, 112V) in the axial direction so as to work as the sun gear. The stopper (17V) is configured to include a contact portion (12st) arranged in the outer circumferential portion of the intermediate element (12V) so as to be located between the adjacent outer teeth gear portions (12t) in the circumferential direction and to contact with a portion (118) of the input element (11V) in accordance with the relative rotation between the input element (11V) and the intermediate element (12V).

The damper device is capable of restricting the relative rotation between the input element and the intermediate element so as to prevent an excessive load including the inertia torque from the rotary inertia mass damper from acting on the first elastic body when a larger torque is transmitted between the input element and the intermediate element, thereby satisfactorily protecting the first elastic body. Further, the contact portion of the stopper is arranged in the outer circumferential portion of the intermediate element (sun gear) so as to make a distance from the axial center of the damper device to the contact portion closer to a distance from the axial center of the damper device to a support portion of the pinion gears in the input element. This decreases moment acting on the input element (the first and the second rotational support members) that supports the plurality of pinion gears and prevents deformation and so on of the input element when the contact portion contacts with the input element so as to restrict the relative rotation between the input element and the intermediate element. Accordingly, the durability of the damper device with the rotary inertia mass damper can be improved.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the damper device.

The invention claimed is:
1. A damper device comprising:
a plurality of rotational elements including an input element to which a torque from an engine is transmitted and an output element,
a plurality of elastic bodies respectively arranged to transmit a torque between the input element and the output element,
a rotary inertia mass damper with a mass body that oscillates in accordance with relative rotation between a first rotational element which is one of the plurality of rotational elements and a second rotational element different from the first rotational element, and
a housing that houses the plurality of rotational elements, the plurality of elastic bodies and the rotary inertia mass damper, the housing including a front cover,
wherein the rotary inertia mass damper is configured to include a planetary gear that includes a sun gear, a plurality of pinion gears, a carrier that rotatably supports the plurality of pinion gears, and a ring gear that meshes with the plurality of pinion gears,
wherein the carrier is arranged to rotate integrally with the first element,
wherein the sun gear is arranged to rotate integrally with the second element,
wherein the ring gear works as the mass body of the rotary inertia mass damper,
wherein the carrier is centered by either the sun gear or a member that rotates integrally with the sun gear by being radially supported by either the sun gear or the member that rotates integrally with the sun gear, and
wherein the carrier is spline-engaged to the front cover when a lockup clutch is engaged.
2. The damper device according to claim 1,
wherein the first rotational element is the input element and the second rotational element is the output element.
3. The damper device according to claim 1,
wherein the ring gear is not aligned by the plurality of rotational elements including the input element and the output element.
4. The damper device according to claim 1,
wherein the first rotational element is configured to include two plate members arranged to be opposed to each other in an axial direction such as to support the plurality of elastic bodies and to rotatably support the plurality of pinion gears, the two plate members working as the carrier, and
wherein at least one of the two plate members is aligned by either the sun gear or the member that rotates integrally with the sun gear.
5. The damper device according to claim 4,
wherein the output element is a single output plate member disposed between the two plate members in the axial direction, the output plate member including outer teeth in an outer circumference thereof such as to work as the sun gear.
6. The damper device according to claim 4,
wherein the carrier is aligned by an output member of the damper device that rotates integrally with the sun gear and is connected with an input shaft of a transmission.
7. The damper device according to claim 1,
wherein the plurality of rotational elements includes an intermediate element, and
wherein the plurality of elastic bodies include a first elastic body arranged to transmit a torque between the input element and the intermediate element, and a second elastic body arranged to transmit a torque between the intermediate element and the output element.

* * * * *